United States Patent [19]
Todoroki et al.

[11] Patent Number: 5,655,046
[45] Date of Patent: Aug. 5, 1997

[54] GLASS COMPOSITION, OPTICAL FIBER MADE OF SAME, AND METHOD FOR PREPARING GLASSES

[75] Inventors: Shin-ichi Todoroki; Shigeki Sakaguchi, both of Mito, Japan

[73] Assignee: Nippon Telegraph and Telephone Corporation, Tokyo, Japan

[21] Appl. No.: 570,769

[22] Filed: Dec. 12, 1995

[30] Foreign Application Priority Data

Dec. 14, 1994 [JP] Japan .................. 6-310341
Jan. 17, 1995 [JP] Japan .................. 7-004656
Jan. 17, 1995 [JP] Japan .................. 7-004657

[51] Int. Cl.⁶ .................................................. G02B 6/00
[52] U.S. Cl. .................................................. 385/144
[58] Field of Search ................. 65/413, 121, 426, 65/427, DIG. 16, 388, 188, 389, 17.2; 385/123, 141, 144, 147, 128

[56] References Cited

U.S. PATENT DOCUMENTS

| | | | |
|---|---|---|---|
| 4,065,280 | 12/1977 | Kao et al. | 65/413 |
| 4,253,863 | 3/1981 | Iyengar | 65/181 |
| 4,322,500 | 3/1982 | Drake | 385/141 |
| 4,477,580 | 10/1984 | Fleming, Jr. | 65/17.2 |
| 4,856,859 | 8/1989 | Imoto | 385/129 |
| 4,885,186 | 12/1989 | Bagley et al. | 427/539 |
| 5,573,571 | 11/1996 | Kopylov | 65/388 |

FOREIGN PATENT DOCUMENTS

| | | |
|---|---|---|
| 60-155551 | 8/1985 | Japan . |
| 63-103832 | 5/1988 | Japan . |
| 4-300224 | 10/1992 | Japan . |

OTHER PUBLICATIONS

Pergamon Press, Inc., Mat. Res. Bull., 1975, vol. 10, pp. 133–146, "Investigation of the Soda Aluminosilicate Glass System for Application to Fiber Optical Waveguides", D. A. Pinnow et al.

JNS, (1984), vol. 66, pp. 487–499, "The Rayleigh Scattering Loss in Silicate Glasses Containing PbO", G.A.C.M. Spierings et al.

Academic Press, Treatise on Materials Science and Technology, 1977, vol. 12, pp. 195–201, "Light Scattering of Glass", John Schroeder.

Journal of the American Ceramic Society, Sep. 1995, vol. 78, No. 9, "Alkali Magnesium/Zinc Silicate Glasses with Low Rayleigh Scattering", Shin-ichi Todoroki et al.

Primary Examiner—Akm E. Ullah
Attorney, Agent, or Firm—Spencer & Frank

[57] ABSTRACT

A glass composition comprises an oxyfluoride glass comprising silicon, a divalent metal, a monovalent metal, oxygen, and fluorine, satisfying requirements: (1) the silicon is present in an amount of 40% or more and 75% or less based on total number of cations; (2) the divalent metal is present in an amount of 30% or less based on total number of cations; (3) the monovalent metal is present in an amount of 18% ore more and 60% or less based on total number of cations; and (4) the fluorine is present in an amount of below 20% based on total amount of anions. An optical fiber comprises a clad made of the glass composition and a core made of a silicate glass comprising silicon dioxide, a divalent metal compound, and a monovalent metal compound in which (9) the clad glass contains more $SiO_2$ than the core or (10) the clad glass contains fluoride(s) of the divalent metal and/or the monovalent metal.

3 Claims, 21 Drawing Sheets

GLASS COMPOSITION, OPTICAL FIBER MADE OF SAME, AND METHOD FOR PREPARING GLASSES

BACKGROUND OF THE INVENTION

1. Field of the Invention

The present invention relates to an optical glass composition showing a low light scattering which is useful for optical glass components such as optical fibers for transmission, fiber lasers, and fiber amplifiers as well as to a method for preparing glasses useful for preparing glasses having such composition.

Further, the present invention relates to a low light scattering optical fiber which is useful for optical glass components such as optical fibers for transmission, fiber lasers, and fiber amplifiers as well as to a method for fabricating such an optical fiber.

2. Description of Related Art

Optical fibers made of silica glass have been put into practical use in optical communication. Loss margins of optical fibers are dominated by factors including intrinsic properties of glass, i.e., absorption due to molecular oscillation in infrared light region and scattering in visible light region (Rayleigh scattering). In order to obtain loss characteristics lower than that of current quartz optical fibers, there have been made extensive investigations with various glass materials. Generally, a lower loss would be obtained by the use of materials having lower scattering and lower absorption.

Fluoride glasses have been studied widely since they show excellent transmittance to infrared lights. However, upon preparation, they tend to precipitate microcrystals, which serve as centers of light scattering so that they have a high loss (J. B. MacChesney and D. J. DiGiovanni, J. Am Ceram. Soc., 1990, vol. 73, 3537–3556). This tendency of crystallization, which inherent to fluoride glasses, is difficult to avoid technically and, hence, there have been obtained no fluoride glass fiber that has loss characteristics superior to that of silica glass fiber.

On the other hand, some studies have been made with silicate glasses in order to attain low scattering. Silicate multicomponent oxide glasses are superior to fluoride glasses in that the former exhibits less crystal precipitation than the latter. However, the infrared transmission of the former is not so high as that of the latter so that it would be necessary to choose a glass composition which has low scattering in the ultraviolet-visible light region before a low loss optical fiber can be realized.

Of alkali-alkaline earth silicate glasses, there have been obtained glass compositions having lower Rayleigh scattering (J. Schroeder; "Light Scattering of Glass" in M. Tomozawa and R. H. Doremus, "Treatise on materials science and technology", Academic Press, New York, 1977, Vol. 12, p. 199 [$Na_2O$—MgO—$SiO_2$ Glass], and G. A. C. M. Spierings and T. P. M. Meeuwsen; J. Non-Crystl. Solids, 1984, Vol. 66, p. 494 [$K_2O$-MgO-$SiO_2$ Class]).

In their earlier studies (S. Todoroki and S. Sakaguchi, J. Am. Cer. Soc., 78[9], 2566–68 (1995) and unpublished work), the present inventors have found that oxide compositions, or more specifically, silicate glass compositions composed of silicon dioxide ($SiO_2$), a divalent metal oxide ($M^{II}O$, where $M^{II}$ represents a divalent cation), and a monovalent metal compound ($M_2^{I}O$, where $M^{I}$ is a monovalent cation) which contain 50 to 80 mol % of $SiO_2$, 0 to 20 mol % of $M^{II}O$, and 15 to 40 mol % of $M_2^{I}O$ have lower light scattering than pure $SiO_2$ glass and can vitrify stably than pure $SiO_2$ glass. $M^{II}$ may be at least one element selected from the group consisting of Mg, Ca, Sr, Ba, and Zn. On the other hand, $M^{I}$ may be at least one element selected from the group consisting of Li, Na, and K.

The components of the above-described silicate glasses are limited since crystals tend to precipitate when the $SiO_2$ content is less than 50 mol %, or the $M_2^{I}O$ content is more than 40 mol %, while light scattering increases when the $SiO_2$ content is more than 80 mol %, the $M^{II}O$ content is more than 20 mol %, or the $M_2^{I}O$ content is less than 15 mol %.

However, there has been no attempt to fabricate optical fibers from the above-described silicate glass compositions. In other words, there has been known no glass that can provide glass compositions which have slightly different refractive indices for use as core and clad, which show low scattering, and which are thermally stable enough to fabricate optical fibers.

In the case where optical fibers are fabricated from the above-mentioned glasses found in the earlier studies by the present inventors, in order to form a waveguide structure, there are needed two kinds of glasses having similar thermal properties but different refractive indices, one for the core and another for the clad. In order to obtain equivalent thermal properties, it would be better to use glasses as close in composition as possible. For this purpose, generally, there are two approaches:

(1) To dope a core glass with a component which increases its refractive index; and (2) To dope a clad glass with a component which decreases its refractive index.

In the case of (1) above, the increase in refractive index results in an increased Rayleigh scattering. That is, the Rayleigh scattering inherent to glasses increases in proportion to the 8th power of n, refractive index, as expressed by the following equation (D. A. Pinnow et al., Appl. Phys. Lett., Vol. 22, p. 527 (1973)):

$$\alpha = \frac{8\pi^3}{3\lambda^1} n^6 p^2 k K_T(T_F) T_F \quad (E1)$$

wherein n is the refractive index;

k is Boltzmann constant;

p is the photoelastic constant;

$K_T(T_F)$ is the static isothermal compression; and $T_F$ is the fictive temperature, which is equivalent to the glass transition temperature (Tg).

In fact, an increased scattering of a glass doped with Pb has been reported (G. A. C. M. Spierings and T. P. M. Meeuwsen; J. Non-Cryst. Solids, 1984, Vol. 66, p. 464).

In the case of (2) above, it has been known that doping of a silica glass with boron (B) or fluorine (F) decreases Tg and n (T. Ixawa and S. Sudo, "Optical fibers: materials and fabrication", KTK Scientific Publishers, p. 27 (1987). Accordingly, it is considered effective to dope a glass with boron (B) or fluorine (F) in order to decrease its refractive index. However, boron increases infrared absorption of a glass when doped therein and, hence, it is ineffective for loss reduction. Thus, introduction or doping of fluorine would be considered hopeful.

However, as far as the present inventors know, there has been no report on fluorine-doped silicate glass having low Rayleigh scattering although many examples of fluorine-doped silicate glass compositions were known.

For example, some optical glass compositions contain fluorine (Ullmann's Encyclopedia of Industrial Chemistry, 5th edition, Vol. A18. (1991) p. 201). In spite of many investigations on Rayleigh scattering of optical glasses as described in, for example, J. Schroeder et al., J. Non-Cryst. Solids, Vol. 13, pp. 313–320, Y. Moriya et al., Yogyo-Kyokai-Shi, Vol. 22, p. 527 (1973), there has been known no glass that has a loss lower than the loss of silica glass currently used for optical fibers as low as 1.1 dB/km at 0.8 µm; D. A. Pinnow et al.; Appl. Phys. Lett., Vol. 22, p. 527 (1973).

The reason for this would be that introduction of fluorine in silicate glasses induces generation of a heterogeneous structure such as phase separation or precipitation of crystals. In fact, in the glass industries, fluorides are generally used in order to obtain opal glasses or crystallized glasses (H. Scholze, "Glass—Nature, Structure and Properties", Springer-Verlag, New York, 1991). Degree of phase separation or crystallization relates to glass composition closely. However, there has been no report that describes specific silicate oxyfluoride glass composition which forms stable glass and has a low light scattering.

As described above, oxyfluoride silicate glasses have low refractive indices and low glass transition temperatures and, hence, are expected to be materials which show low light scattering. However, it is known that fluorine in silicate glass causes phase separation and crystallization, resulting in light scattering. Therefore, relation between light scattering intensity and composition of glass remains to be clarified.

In other words, there is known no clad glass that has a low refractive index, shows a low scattering and is thermally stable, the clad glass being necessary to fabricate an optical fiber with a silicate glass core having a low Rayleigh scattering.

Optical glass components, whose representative example is an optical fiber, must be highly pure and homogeneous so that attenuation of light which transmits therein can be minimized. In a conventional method for the manufacture of such glasses, starting materials are introduced in a crucible and heated until they are molten. Therefore, it is inevitable that impurities from the crucible contaminate the glass.

As a method for solving the problem, there has been known a vapor phase synthesis represented by vapor phase axial deposition (VAD) method. This method, which does not involve a liquid state, needs no vessel so that contamination of impurities from a vessel can be prevented and enables one to carry out high purity synthesis. Further, since a heated liquid generates a convection current, the glass which has been once molten tends to form striae, i.e., portions which have uneven refractive indices, while the vapor phase deposition methods can produce homogeneous glass without striae.

However, the vapor phase deposition methods have a limitation in that metals having relatively low vapor pressure such as alkali metals, alkaline earth metals, and rare earth metals cannot be incorporated. And, it is often needed to introduce such low vapor pressure metals into glass compositions in order to meet various optical properties required for optical components.

As a method for introducing such metal elements, there has been used in combination a solution doping method (J. B. MacChesney and D. J. DiGiovanni, "Materials Development of Optical Fiber", J. Am. Ceram. Soc., 73, 12 (1990) 3537–3556).

In the solution doping method, a porous glass matrix is used which is prepared by depositing fine particles of a glass formed by flame hydrolysis of a metal compound in vapor phase, for example, a halide such as $SiCl_4$, together with $H_2$ and $O_2$. The matrix is dipped in a solution of a metal compound, taken out from the solution, dried to remove the solvent, and sintered at high temperatures to form a transparent glass. The use of the solution doping method in combination enables one to introduce low vapor pressure metals without deteriorating the advantage of the vapor phase synthesis, i.e., less contamination of impurities.

However, in the above-described solution doping method, evaporation (gasification from a liquid phase) of the solvent near the surface of the porous glass matrix occurs so that the solvent which is mobile at the time of evaporation transports the solute to near the surface of the matrix and deposition of the dopant on the surface occurs inevitably.

As a result, if the bulk density of the porous glass matrix is uniform, the solvent and solute distribute uniformly before drying as shown in FIG. 1 in broken lines Ca and Cb, respectively, and according as the drying proceeds, the solute distributes in a higher concentration in a position nearer the surface as shown in FIG. 2 in broken line Cb.

As described above, the solution doping method has a disadvantage that upon evaporation the solvent transports the solute, resulting in excessive accumulation of the metal compound near the surface of the matrix.

In order to solve this problem, there has been known a method in which the dopant which was localized near the surface of the porous glass matrix is washed away (Japanese Patent Application Laying-open No. 300224/1992).

However, in this method, only a portion of the solute which is contained in the solution used for the solution doping is doped into the porous glass matrix and, hence, the amount of the metal doped is limited. Accordingly, the glass compositions which can be prepared by this method are limited.

As described above, in the preparation of glass by a gas phase synthesis along with a solution doping method, glasses that can be synthesized by the method have only limited compositions because of localized deposition of the metal compound used for doping near the surface of the porous glass matrix.

SUMMARY OF THE INVENTION

An object of the present invention is to obviate the effect of doping of fluorine on the increase of scattering and provide a low scattering oxyfluoride glass having a high glass forming ability.

Another object of the present invention is to provide an optical fiber made of low scattering silicate glasses, using low refractive index and low scattering glass materials in combination.

Still another object of the present invention is to solve the problem of the conventional solution doping method that the amount of the dopant inside the matrix is limited because of the precipitation of the dopant near the surface of the porous glass matrix after drying, and to enlarge the glass composition area where homogeneous and highly pure glasses can be prepared.

According to a first aspect of the present invention, there is provided a glass composition comprising an oxyfluoride glass comprising silicon, a divalent metal, a monovalent metal, oxygen, and fluorine, wherein the composition satisfies following requirements: (1) the silicon is present in an amount of 40% or more and 75% or less based on total number of cations; (2) the divalent metal is present in an amount of 30% or less based on total number of cations; (3) the monovalent metal is present in an amount of 18% or more and 60% or less based on total number of cations; and (4) the fluorine is present in an amount of below 20% based on total amount of anions.

Here, the glass composition may contain Na as the monovalent metal and when the amounts of the monovalent metal and divalent metal based on total number of cations are expressed as x atom.% and y atom.%, respectively, and the amount of the fluorine based on total number of anions is expressed as z atom.%, x, y and z satisfy the following requirements: (5) y<−3x/4+47.5−0.25 z, (6) y>−x+35+z/2, (i.e., the amount of silicon based on total amount of cations is not more than (65 z/2) atom.%) and (7) x>y (i.e., the amount of the monovalent metal is larger than that of the divalent metal).

The glass composition may comprise K as the monovalent metal, and when the amounts of the monovalent metal, divalent metal, and silicon based on total number of cations are expressed as x and y atom.%, respectively, x, y and z satisfy the following requirements: (5) y<−3x/4+47.5−0.25 z, and (6) y>−100x/(21+z)+100.

The divalent metal may be at least one element selected from the group consisting of Mg, Zn, Ca, Sr, and Ba.

The glass composition as claimed in claim 3, wherein the glass composition comprising cations $M^I$ and $M^{II}$ and Si in a proportion corresponding to an area embraced by curves α and β in a ternary constitution diagram shown in FIGS. 3, 8, 9, 10, 11, 13, 14, 15, and 16 in the attached drawings.

According to a second aspect of the present invention, there is provided an optical fiber comprising: a core made of a silicate glass comprising silicon dioxide, a divalent metal compound, and a monovalent metal compound, and a clad made of an oxyfluoride glass composition comprising silicon, a divalent metal, a monovalent metal, oxygen, and fluorine, wherein the oxyfluoride glass composition satisfies the following requirements: (1) the silicon is present in an amount of 40% or more and 75% or less based on total number of cations; (2) the divalent metal is present in an amount of 30% or less based on total number of cations; (3) the monovalent metal is present in an amount of 18% or more and 60% or less based on total number of cations; and (4) the fluorine is present in an amount of below 20% based on total amount of anions; and wherein the oxyfluoride glass composition satisfies one of the following requirements (9) and (10): (9) the clad glass contains more $SiO_2$ than the core; and (10) the clad glass contains fluoride(s) of the divalent metal and/or the monovalent metal.

Here, the divalent metal may be at least one element selected from the group consisting of Mg, Ca, Sr, Ba, and Zn, and the monovalent metal is at least one element selected from the group consisting of Li, Na, and K.

The core glass and the clad glass may have viscosities so that at least one point within the ranges between $10^5$ dPas and $10^{10}$ dPas, a ratio of the viscosity of the core glass to that of the clad glass is from 0.33 to 3.

The clad may be made of a glass composition comprising cations $M^I$ and $M^{II}$ and Si corresponding to an area embraced by curves α and β in a ternary constitution diagram shown in FIGS. 3, 8, 9, 10, 11, 13, 14, 15, and 16 in the attached drawings.

According to a third aspect of the present invention, there is provided a method for preparing a glass comprising the steps of: 1) impregnating a porous glass matrix with a solution or dispersion of a metal compound; 2) cooling the impregnated porous glass matrix to a temperature below a melting point of the solution or dispersion; 3) elevating temperature of the porous glass matrix to a temperature above a sublimation temperature of the solvent or dispersion medium under reduced pressure to dry the solvent or dispersion medium; and 4) heating the dried porous glass matrix to convert into a transparent glass.

Here, the porous glass matrix may have a refractive index distribution necessary for forming an optical waveguide.

The solvent or dispersion medium may be selected from the group consisting of water, aqueous hydrogen peroxide solution, and organic solvents.

The metal compound may be at least one compound selected from the group consisting of nitrates, sulfates, formates, acetates and halides.

The metal compound may be in the form of fine particles having an average particle diameter smaller than a pore diameter of the porous glass matrix.

The glass composition may have the above-described composition.

The above and other objects, effects, features and advantages of the present invention will become more apparent from the following description of the embodiment thereof taken in conjunction with the accompanying drawings.

BRIEF DESCRIPTION OF THE DRAWINGS

FIGS. 5(A) to 5(D) are schematic plan views showing a porous glass matrix;

DETAILED DESCRIPTION OF THE INVENTION

In the oxyfluoride glass composition composed of silicon, a divalent metal, a monovalent metal, oxygen and fluorine, crystals tend to deposit in the glass, if silicon is in amounts less than 40% of the total number of cations, the monovalent metal is in amounts more than 60% of the total number of cations, or fluorine is in amounts more than 20% of the total number anions. On the other hand, light scattering is larger than that of silica glass, if silicon is in amounts more than 75% of the total number of cations, the divalent metal is in amounts more than 30% of the total number of cations, or the monovalent metal is in amounts less than 18% of the total number anions.

Figure 3:
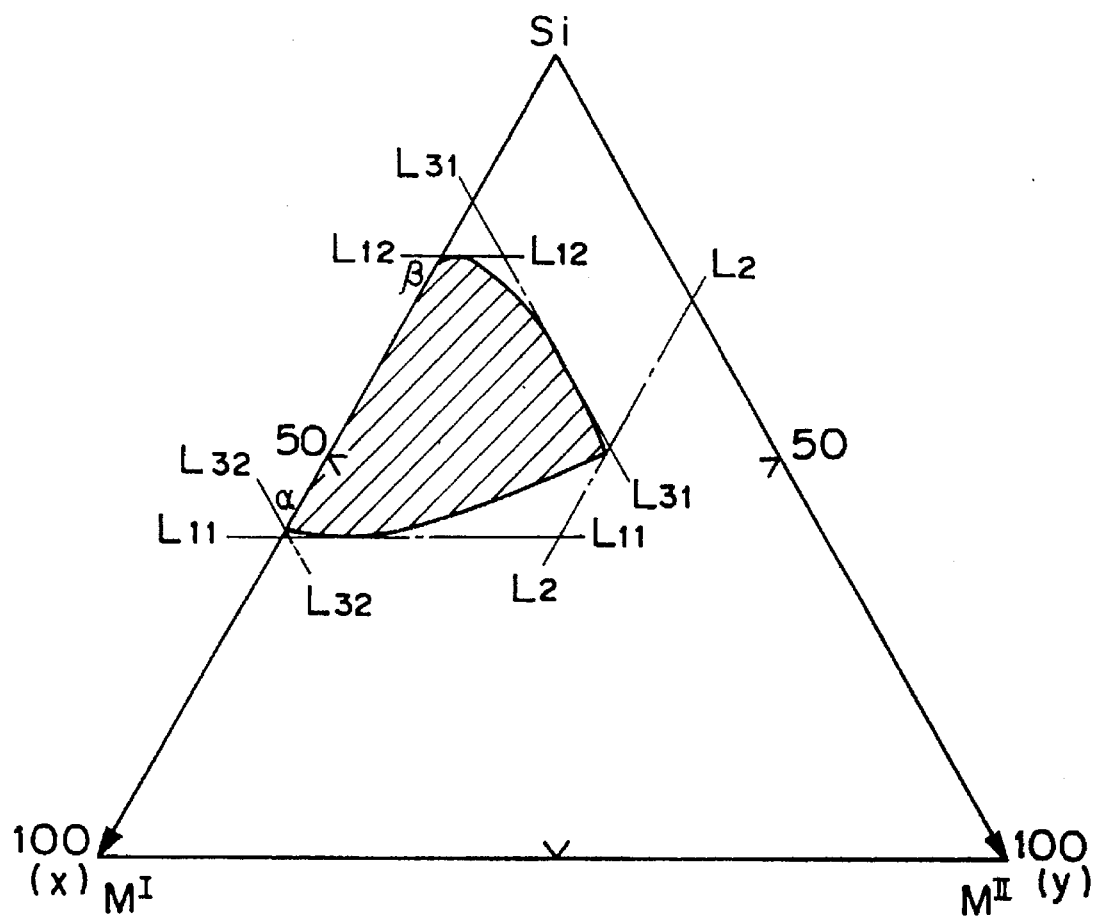
FIG. 3 is a ternary constitution diagram illustrating an overlap between a glass formation range and a composition range satisfying R<1.

As shown in FIG. 3, glass formation is easier to occur in a region above the curve α, while a relative value of Rayleigh scattering intensity at a scattering angle of 90° relative to that of pure $SiO_2$ is smaller than 1 (R<1) in a region below the curve β.

In FIG. 3, the area embraced by the curves α and β (hatched area in FIG. 3) are defined by approximation by auxiliary lines L11, L12, L2, L31, and L32.

Here, the auxiliary lines L11 and L12 indicates that silicon is in amounts of 40% and 75% of the total number of cations, respectively. Hence, the area embraced by the auxiliary lines L11 and L12 satisfy the requirement (1) above.

The auxiliary line L2 indicates that the divalent metal ion is in an amount of 30% of the total number of cations. The area above the auxiliary line L2 satisfies the requirement (2) above.

Further, the auxiliary lines L31 and L32 indicate that the monovalent metal ion is in amounts of 18% and 60% of the total number of cations, respectively. Thus, the area embraced by the auxiliary lines L31 and L32 satisfies the requirement (3) above.

In addition, the requirement (4) above, i.e., fluorine being in amounts of less than 20% of the total number of anions must be satisfied. Otherwise, no glass can be obtained that has a relative Rayleigh scattering intensity relative to that of pure $SiO_2$ smaller than 1 (R<1) at a scattering angle of 90°.

In summary, the glass compositions which exhibit low Rayleigh scattering intensities and form stable glass can be obtained when their compositions are within the area defined by the auxiliary lines L11, L12, L2, L31, and L32 and on the condition that fluorine is in amounts of less than 20% of the total number of anions.

It has also been known that doping of a clad glass with a component that decreases the viscosity of the glass causes concentration of stress upon fiber drawing on the core, which has a higher viscosity, with the result that loss of the resulting optical fiber increases (F. Hanawa, Y. Hibino, and M. Horiguchi, Electronic Information and Communication Society Reports C-I, Vol. 72-C-I No. 3, pp. 167–176 (1989)). Therefore, it is desirable that at the temperature at which fibers are drawn, the viscosity of the clad is not so much lower than that of the core. In this regard, it is preferred that the viscosity of the clad is within the range between $10^5$ dPas and $10^{10}$ dPas. It is set larger than $10^5$ dPas so that minimum tension can be given upon fiber drawing and smaller than $10^{10}$ dPas so that the preform is susceptible to plastic deformation.

Furthermore, the composition of the glass can be adjusted so that the viscosity which decreased as a result of substitution with a fluoride can be compensated by increasing the content of $SiO_2$.

The above-described synthesis of glass can be performed by mixing $SiO_2$, $Na_2CO_3$, $MgO$, $MgF_2$ powders (preferably each being of a purity of more than 99.9%) in a predetermined proportion, placing the resulting mixture in a platinum crucible, heating the crucible in an electric furnace at a temperature elevation rate of 1° to 100° C./minute, preferably 10° to 40° C./minute to a temperature of 1,200° to 1,600° C., preferably 1,300° to 1,500° C., retaining that temperature for melting for 1 to 4 hours, and then cooling down to ambient temperature at a rate of −1° to −100° C./minute.

Preferably, the above-described synthesis of glass is performed by freezing a porous glass matrix impregnated with a solution or colloidal solution of metal compound(s) to a temperature below the melting point of the solution or colloidal solution to precipitate crystals, and then increasing the temperature of the matrix to a temperature above the sublimation temperature of the solvent or dispersion medium of the (colloidal) solution under reduced pressure (hereafter, referred to as "lyophilizing" or "freezing and drying").

Figure 1:
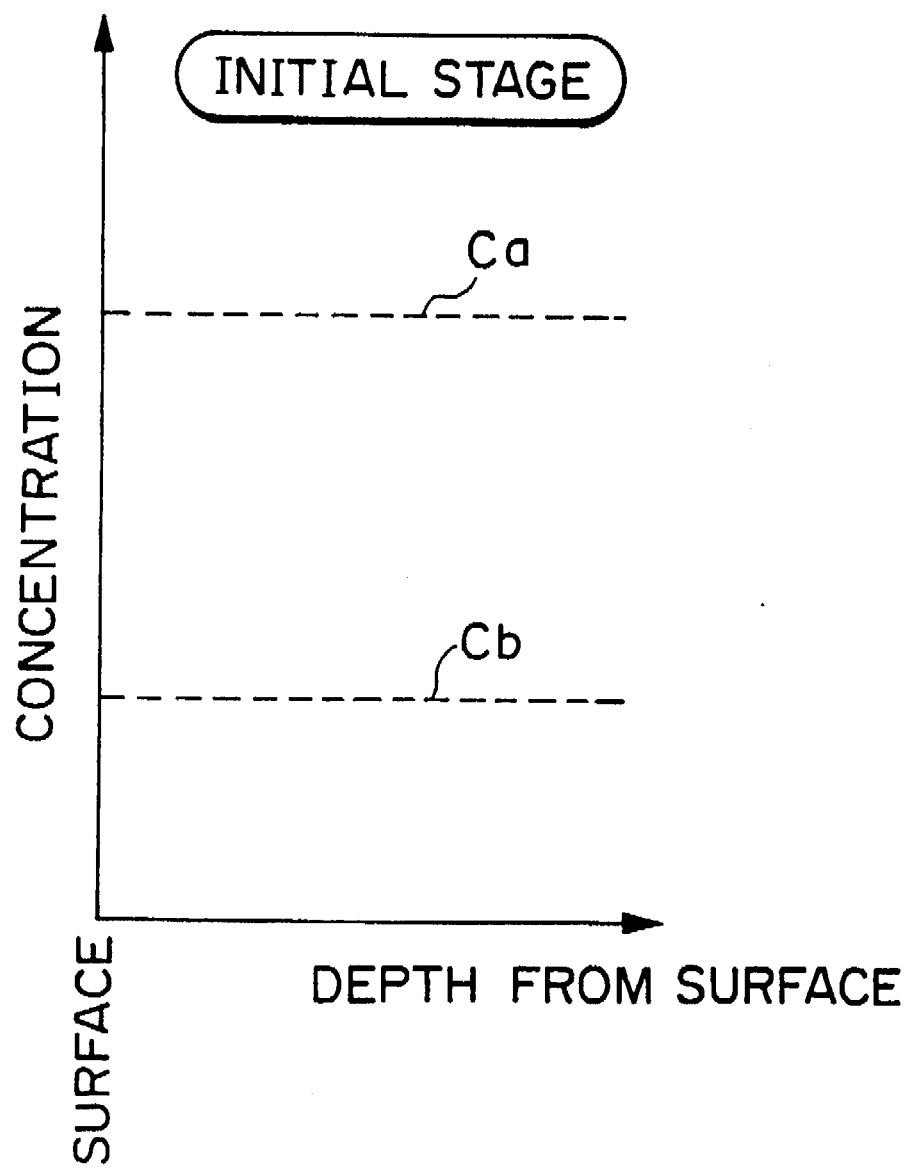
FIG. 1 is a graph illustrating distributions of concentrations of a solvent and a solute in a porous glass matrix before evaporation of the solvent.
Figure 2:
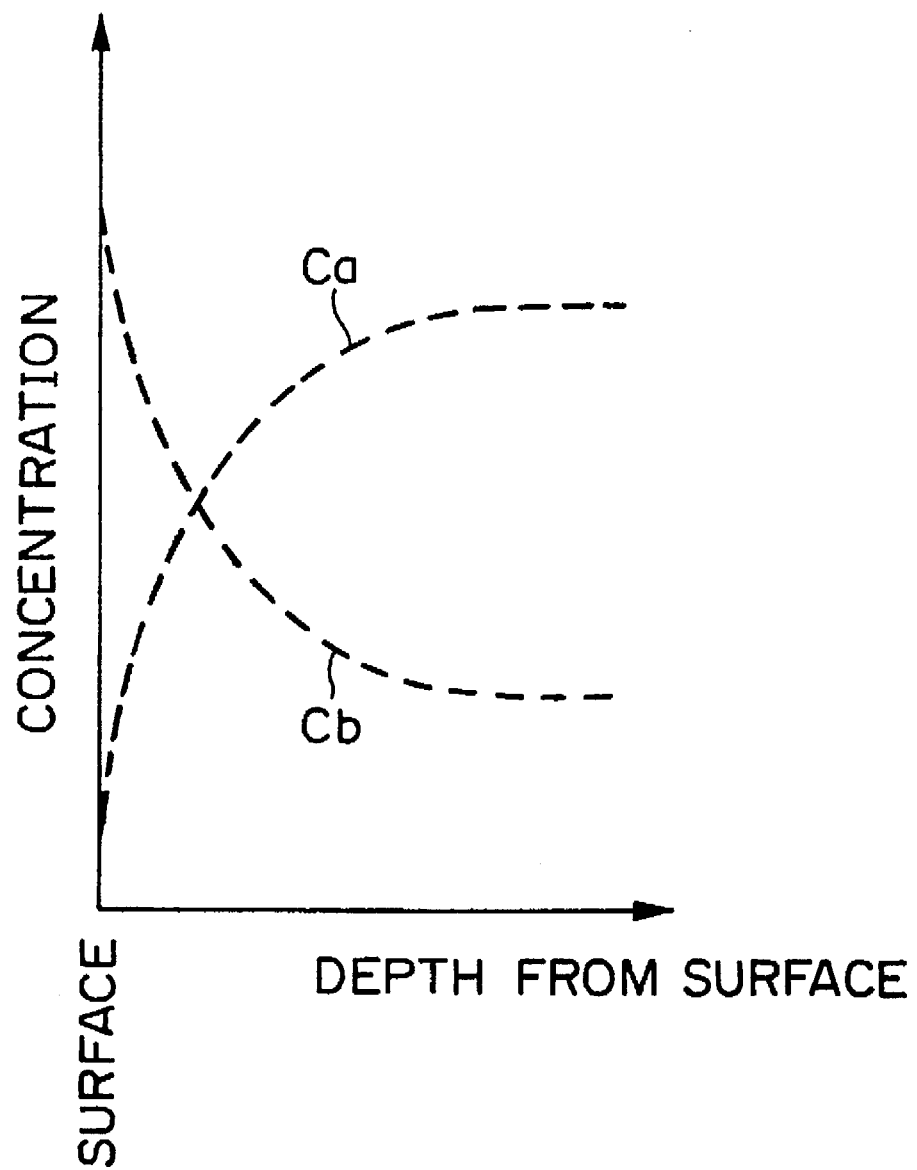
FIG. 2 is a graph illustrating distributions of concentrations of a solvent and a solute in a porous glass matrix during evaporation (spontaneous drying) of the solvent.

When the porous glass matrix is impregnated with a (colloidal) solution of metal compound(s), the solute and the solvent contained in the solution distribute uniformly in the inside or cavities of the porous glass matrix as illustrated in FIG. 1 in broken lines α and β.

Then, cooling of the porous glass matrix impregnated with the (colloidal) solution of the metal compound(s) to a temperature below the melting point of the solvent or dispersion medium causes the solvent or dispersion medium to freeze inside or in the cavities of the porous glass matrix to form crystals.

When the porous glass matrix is heated to a temperature above the sublimation temperature of the solvent or dispersion medium, the solvent or dispersion medium sublimates (evaporation from the state of solid) and is removed from the surface of the matrix without moving.

In this manner, the solvent, which is solid when it sublimates, has lost its mobility so that it does not move the metal compound(s), i.e., solute or disperse phase, toward the surface of the matrix.

Figure 4:
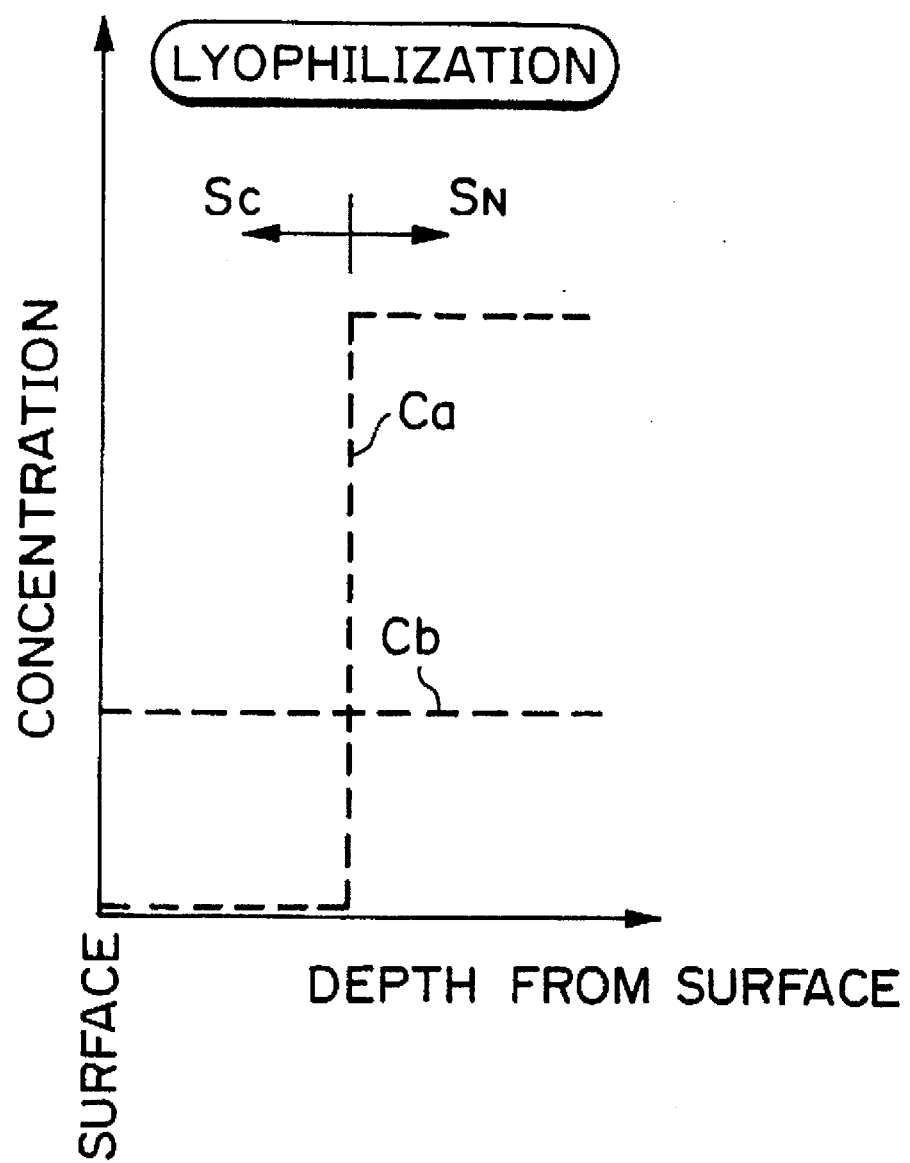
FIG. 4 is a graph illustrating distributions of concentrations of a solvent and a solute in a porous glass matrix during sublimation of the solvent.

As a result, the metal compound(s) (solute or disperse phase) can be distributed uniformly in the porous glass matrix as illustrated in FIG. 4 in broken line Cb. In FIG. 4, the symbol Sc indicates a region where sublimation was already completed and the symbol SN indicates a region where sublimation has not occurred yet.

Hereafter, the method of glass synthesis by freezing and drying according to the present invention will be described in detail with reference to FIGS. 5(A) to 5(D).

Figure 5:
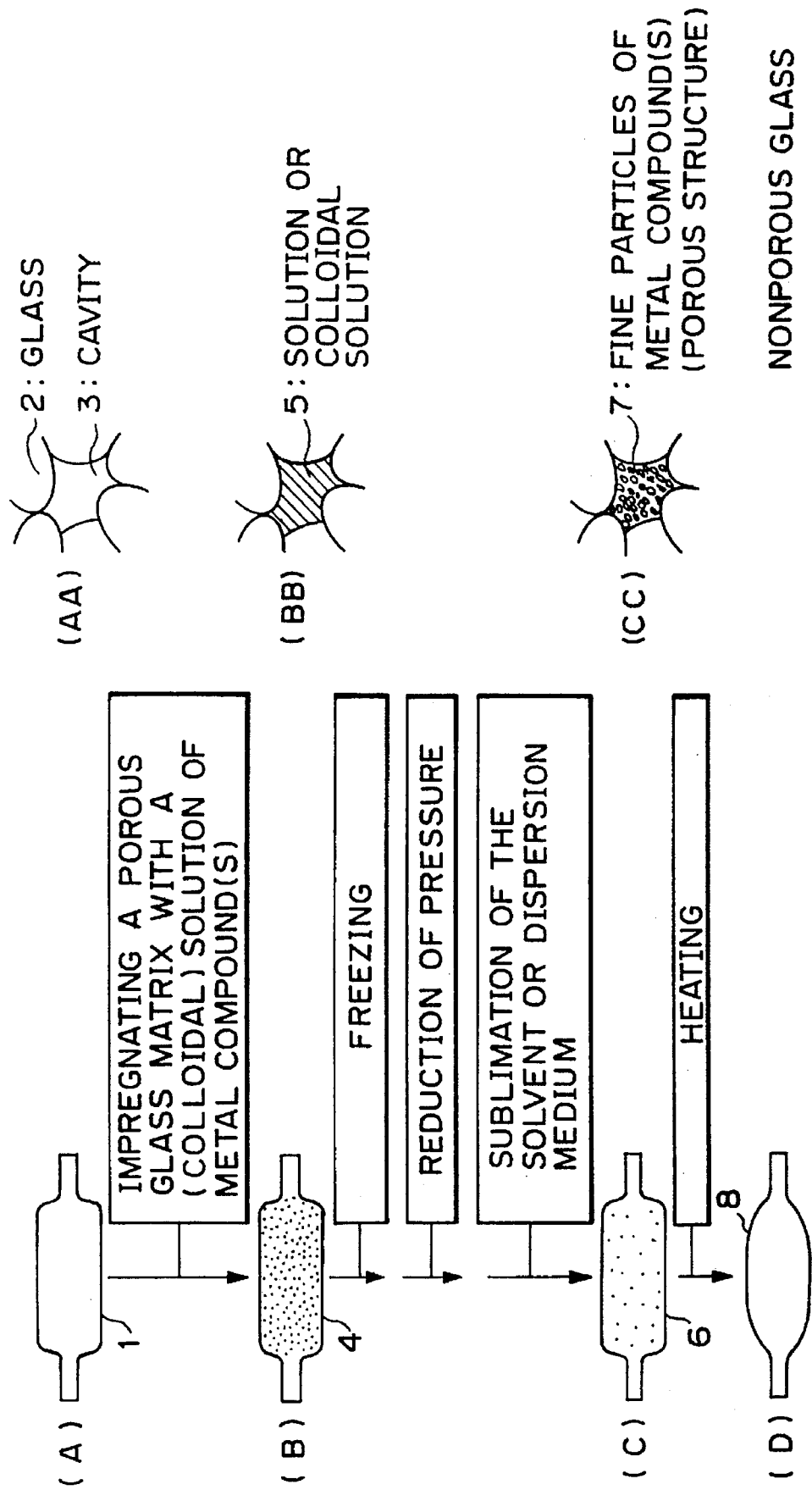
FIGS. 5(AA), 5(BB) and 5(CC) are schematic cross sectional views showing a portion of a cavity in a porous glass matrix.

As shown in FIG. 5(A), a porous glass matrix 1 is provided. FIG. 5(AA) is a schematic illustration of a portion of the porous glass matrix 1, which comprises a glass portion 2 surrounding a cavity 3. The porous glass matrix 1 is impregnated with a solution as by immersion (FIG. 5(B)). In this case, substantially all the cavity 3 of the porous glass matrix 1 is filled with the metal compound(s) solution 5 as illustrated in FIG. 5(BB). The porous glass matrix impregnated with the metal compound solution (impregnated porous glass matrix 4) is frozen, for example in a refrigerator, to cause crystallization and deposition of the solution. The matrix thus treated is then placed in an appropriate vessel and pressure is reduced to 0.6 to 0.01 Torr.

Then, the porous glass matrix is left to stand and its temperature increases due to heat transmission or heat radiation from the vessel until the sublimation temperature of the solvent at which temperature gasification of the solvent starts.

When the gasification of the solvent is completed, the temperature of the porous glass matrix increases to a temperature higher than the sublimation temperature of the solvent. As described above, the present invention is featured in that the solvent is gasified from the solid state. When the gasification is completed, the porous glass matrix contains solid metal compound in its cavity (metal compound (s)-containing porous glass matrix 6) as illustrated in FIG. 5(C). In this stage, the solid metal compound(s) in the cavity 3 is in the form of a porous body 7 as illustrated in FIG. 5(CC).

Finally, the metal compound(s)-containing porous glass matrix 6 is heated to form a non-porous body (preform) 8 as illustrated in FIG. 5(D).

Since the metal compound(s) after gasification of the solvent is or are porous, the porous glass matrix after lyophilizing can be contacted with a reactive gas to modify the composition of the glass or immersed again in a solution of metal compound(s) so that lyophilization can be repeated. Examples of the reactive gas include $Cl_2$, $SOCl_2$, $SiF_4$, $CF_4$, and $NF_3$.

The lyophilization, which has been used in food and pharmaceutical industries for drying or removing moisture, is used in the present invention for doping a porous glass matrix.

The porous glass matrix which can be used in the present invention may be one which is prepared by a vapor phase axial deposition (VAD) method or an outside vapor deposition (OVD) method.

The porous glass matrix which can be used in the present invention is not limited to ones prepared by the above-described methods and there can also be used a porous glass synthesized by the hydrolysis of a metal alkoxide such as a sol-gel method or a porous glass prepared by eluting phase separated glass with an acid such as sulfuric acid, etc. Further, the porous glass matrix may have a refractive index distribution necessary for fabricating an optical waveguide.

The (colloidal) solution of metal compound(s) consists of (fine particles of) metal compound(s) as a solute and a solvent which dissolves the solute (or a dispersion medium).

The solvent is not limited particularly but various solvents may be used as far as they do not corrode or break the porous glass matrix and lyophilization is applicable thereto. For example, there can be used water, aqueous hydrogen peroxide solution, acetic acid, formic acid, organic solvents such as dioxane, etc. The temperature at which the solution consisting of the solvent and the metal compound or compounds is completely frozen depends on the particular combination of the solvent and the metal compound(s) so that the temperatures for the freezing and sublimation steps may be set up accordingly. In order to set up the working temperature for impregnation and lyophilization of the solution, it is preferred that the solvent and/or metal compound(s) (colloidal) solution have/has a melting point within the range of $-30°$ to $20°$ C.

When the solvent to be used contains an organic solvent, it is important to perform a low temperature heat treatment before sublimation in order to complete crystallization of the solvent since the solvent tends to vitrify. This is because when the solvent does not crystallize but retains the state of glass, the solvent does not sublimate but flows toward the surface of the matrix at the time of sublimation treatment so that localized deposition of the metal compound on the surface of the matrix cannot be prevented.

The metal compound(s) which can be used in the present invention include those metal compounds which are dissolved in the above-described solvents, for example, nitrates, sulfates, formates, acetates, oxides, halides, etc. However, it is not limited thereto.

The metal compound(s) to be introduced in the glass do not have to be dissolved completely in the solvent but may be in the form of a colloidal dispersion containing fine particles, e.g. those having a particle diameter of 10 to 1,000 Angstroms (Å), which can pass the fine pores in the porous glass matrix.

The amount D of the metal compound which can be doped in unit volume of the porous glass matrix can be obtained by the following equation:

$$D = C \times V_{void}(r) \tag{E2}$$

wherein C is the concentration (mol/liter) of the metal compound solution, $V_{void}(r)$ is the volume of cavity per unit volume of the porous glass matrix. $V_{void}(r)$ is obtained by the following equation:

$$V_{void}(r) = 1 - \int \text{glass matrix}_{\rho glass} \rho(r) dr \tag{E3}$$

wherein $\rho(r)$ is the bulk density (kg/liter) of the porous glass matrix at the position r, and $\rho glass$ is the bulk density (kg/liter) of the glass constituting the porous glass matrix.

As will be apparent from the above-described equation, the concentration of the dopant depends on the concentration C of the solution and the bulk density $V_{void}(r)$ of the porous glass matrix. Therefore, if the bulk density $V_{void}(r)$ of the porous glass matrix is distributed non-uniformly, then the concentration of the dopant can be distributed non-uniformly or the doped porous glass matrix can have a radial profile of the dopant concentration.

Non-uniform distribution of the dopant can also be realized by stopping lyophilization halfway, and impregnating the porous glass matrix with another solution followed by lyophilization.

Further, those solutions showing less changes in volume when they are frozen are preferred since the use of such solvents prevents the porous glass matrix from being broken upon a lyophilization treatment.

This method of preparing glasses does not require a reactor such as a crucible so that contamination of impurities can be minimized and is suitable for the preparation of high purity glasses.

The synthesis of glasses by the use of the above-described lyophilization is applicable not only to glasses of the above-described compositions but also to various other glass compositions. For example, according to the glass synthesis of the present invention, a desired glass composition can be prepared by impregnating a porous glass matrix made of silica with a solution or dispersion of one or more metal compounds, followed by lyophilization and melting.

Figure 6:
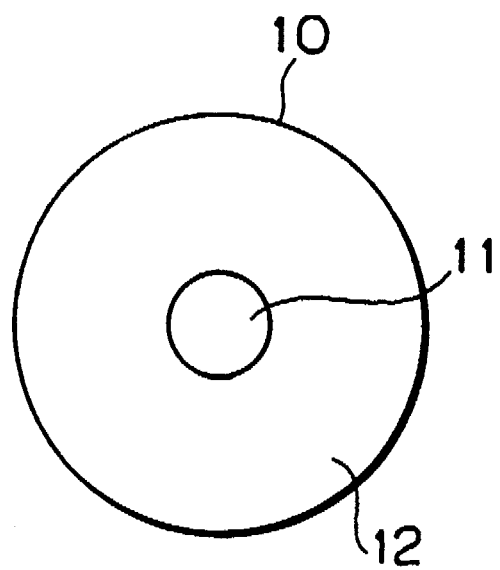
FIG. 6 is a schematic cross sectional view showing an optical fiber made of a glass composition according to the present invention.

FIG. 6 is a schematic cross sectional view showing an optical fiber made of a glass composition of the present invention. An optical fiber 10 has a core 11 made of a silicate glass composition and a clad 12 made of the above-described oxyfluoride glass composition.

In this case, as will be apparent from the description on the equation (E2) above, the refractive index of the clad 12 is decreased by decreasing the amount of dopant, i.e., by increasing the $SiO_2$ content of the clad glass composition as compared with the core glass composition.

The optical fiber may have a primary sheathing such as modified silicone, silicone or the like and a secondary sheathing such as polyimide (e.g., nylon (trademark for a product of Du Pont de Nemours and Company)).

EMBODIMENTS

Hereinafter, the present invention will be described in greater detail by embodiments with reference to the attached drawings. However, the present invention should not be construed as being limited thereto.

In the embodiments, variables used have the following meanings:

x: atom. % of $M^I$ (monovalent metal element) based on total number of cations;

y: atom. % of $M^{II}$ (divalent metal element) based on total number of cations;

z: (atom. % of F (fluorine) based on total number of anions; and

R: relative value of Rayleigh scattering intensity of a glass to that of pure $SiO_2$ glass.

The composition of an oxyfluoride glass is expressed in two ways as below:

1) Mixing molar ratio of oxide compound(s) and fluoride compound(s), e.g.,

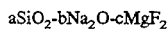

$aSiO_2\text{-}bNa_2O\text{-}cMgF_2$

2) Atomic ratio, e.g.,

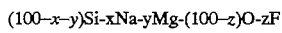

$(100-x-y)Si\text{-}xNa\text{-}yMg\text{-}(100-z)O\text{-}zF$ where $100-x-y$, x, and y indicate atom. % based on total number of cations, and $100-z$ and z indicate atom. % based on total number of anions.

Figure 7:
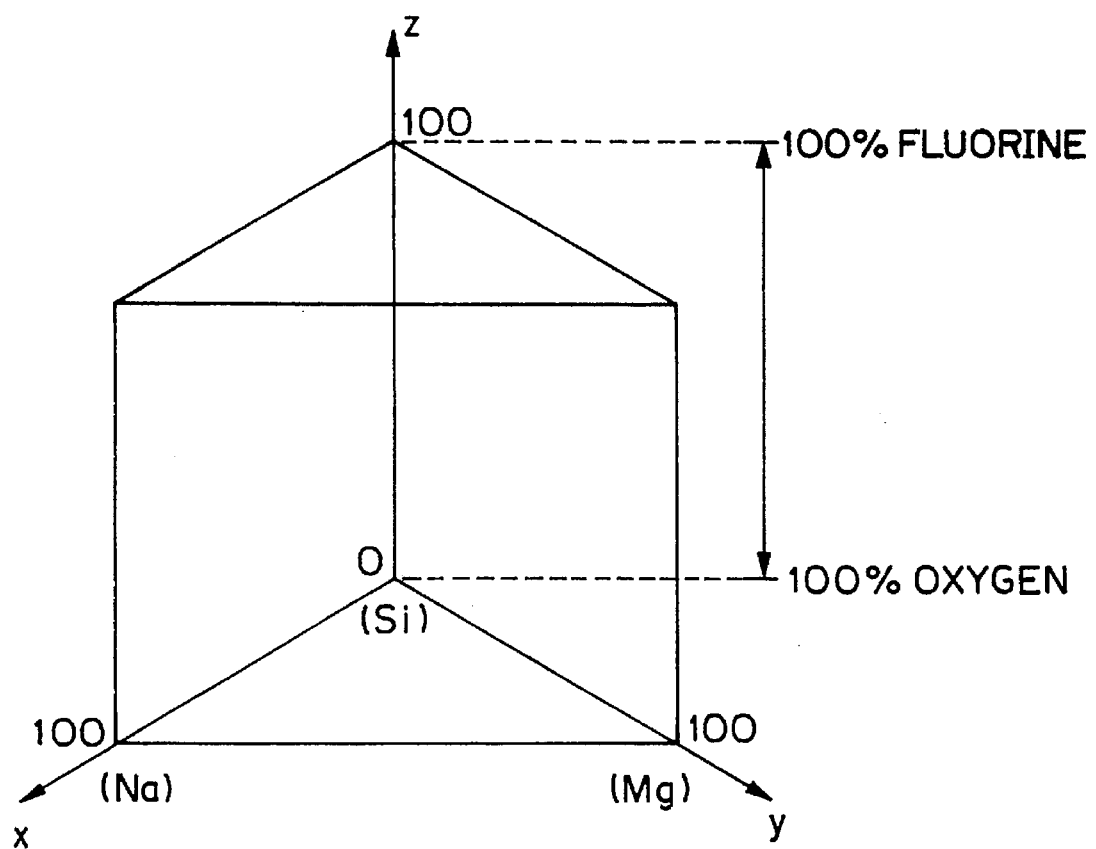
FIG. 7 is a diagram illustrating the manner of expressing the composition of an oxyfluoride glass in a X-Y-Z space.

In the case of the quinary system consisting of Si—Na—Mg—O—F, the latter expression amounts to designate a point (x,y,z) in a three-dimensional space as illustrated in FIG. 7 provided that $0<x, y, z<100$ and $x+y<100$.

Embodiment 1

This embodiment is the first embodiment of the present invention, in which Na and K are used as $M^I$ and Mg is used as $M^{II}$.

Synthesis of the glass was performed by the following procedure. As the starting materials, there were used $SiO_2$, $Na_2CO_3$, $K_2CO_3$, MgO, and $MgF_2$ powders (purity: 99.9% or higher). The powders were weighed to obtain a predetermined proportion of the components and mixed. The mixed starting materials were introduced in a platinum crucible and heated in an electric furnace at a temperature elevation rate of 10° C./minute to a temperature of 1,300° to 1,500° C. and molten for 1 hour at the temperature.

After the melting, the composition was cooled at a rate of −20° C./minute in the furnace. At temperatures below about 800° C., the cooling rate was lower than described above due to the heat capacity of the furnace and, hence, the glass was in the state of being furnace cooled. After the cooling, the crucible was taken out of the furnace and visually observed to see if complete vitrification occurred. Thus, the area where vitrification occurs was determined.

Figure 8:
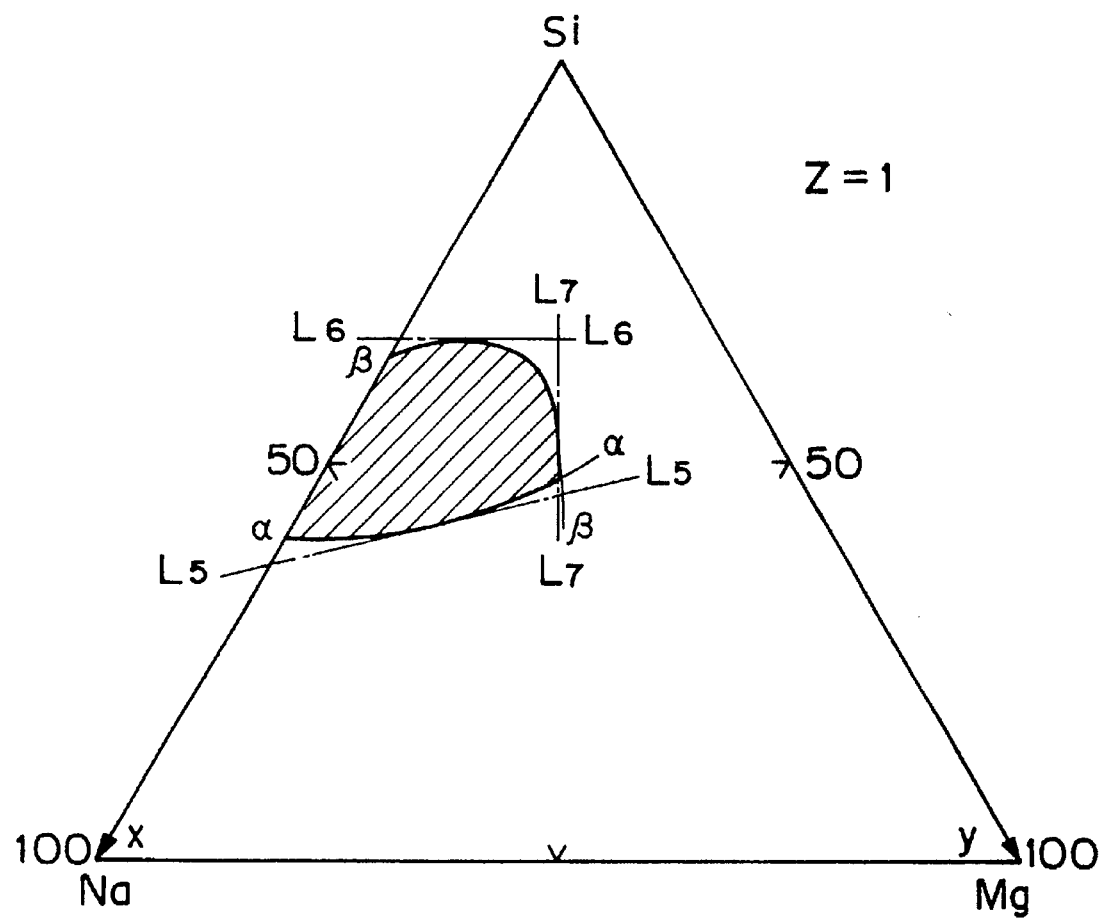
FIG. 8 is a ternary constitution diagram illustrating an overlap between a glass formation range and a composition range satisfying R<1 when $M^I$ is Na, $M^{II}$ is Mg, and z=1.
Figure 9:
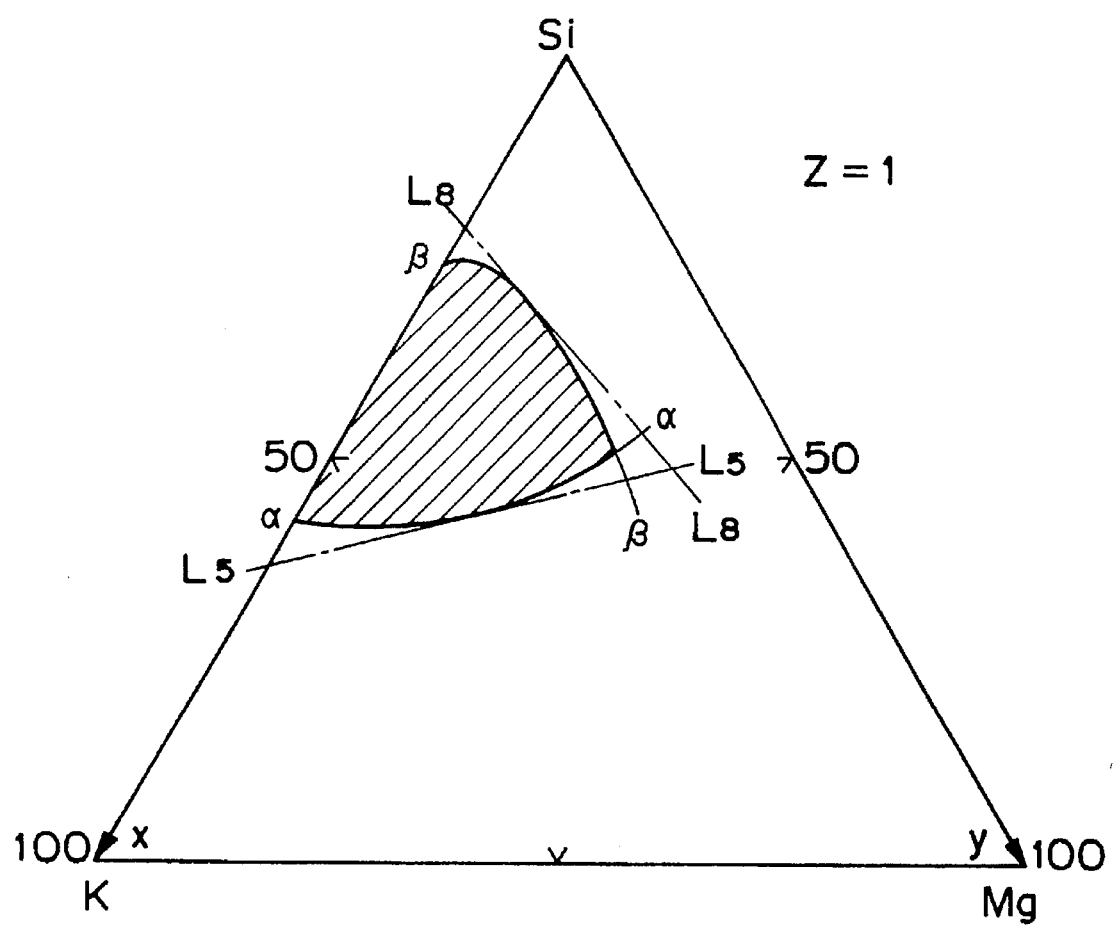
FIG. 9 is a ternary constitution diagram illustrating an overlap between a glass formation range and a composition range satisfying R<1 when $M^I$ is K, $M^{II}$ is Mg, and z=1.

A part of the marginary curve defining the area where vitrification occurs in the case of $z=1$ is indicated by a curve α as illustrated in FIGS. 8 and 9. In the area above the curve α, complete vitrification occurs.

Measurement of Rayleigh scattering was performed on a glass specimen in the form of a circular cylinder having the same composition in this embodiment and a pure $SiO_2$ glass specimen prepared by the VAD method and the value of R was determined. A part of the marginary curve defining the area corresponding to the composition where $R<1$ in the case of $z=1$ is indicated by a curve β in FIGS. 8 and 9. In the area below the curve 62, the condition $R<1$ is met. In the case of compositions where $z>20$, no glass satisfying the condition $R<1$ could be obtained.

In conclusion, a glass which shows no crystallization and which has a Rayleigh scattering intensity smaller than pure silica glass can be obtained under the condition of $0<z<20$ and in the area surrounded by the curves α and β in FIGS. 8 and 9. The compositional region is included in the region satisfying the above requirements (1), (2), (3) and (4) above.

In FIG. 8, auxiliary lines L5, L6, and L7 are defined in order to indicate the area embraced by the curves α and β (hatched area) in terms of variables x, y, and z. The auxiliary line L5 is to approximate the curve α and is defined by the following equation:

$$y=-3x/4+47.5-0.25z \qquad (E4)$$

On the other hand, the auxiliary lines L6 and L6 are to approximate the curve β and are defined by the following equations:

$$y=-x+35+z/2 \qquad (E5)$$

$$y=x \qquad (E6)$$

The auxiliary lines L5 through L7 are indicated in a dotted broken line in FIG. 8.

The oxyfluoride glass of the present embodiment can be described as having a composition which satisfies the condition $0<z<20$ and corresponds to the area embraced by the auxiliary lines L5, L6, and L7. Note that the conditions (5), (6), and (7) described above correspond to the auxiliary lines L5, L6, and L7, respectively.

In FIG. 9, an auxiliary line L8 is defined in order to indicate the area embraced by the curves α and β (hatched area) in terms of variables x, y, and z. The auxiliary line L8 is to approximate the curve β and is defined by the following equation:

$$y=-100x/(21+z)+100 \qquad (E7)$$

On the other hand, the auxiliary line L5 is defined by the following equation:

$$y = -x + 35 + z/2 \quad (E4)$$

The auxiliary lines L5 and L8 are indicated in a dotted broken line in FIG. 9.

The oxyfluoride glass of the present embodiment can be described as having a composition which satisfies the condition $0<z<20$ and corresponds to the area embraced by the auxiliary lines L5 and L8. Note that the conditions (5) and (8) described above correspond to the auxiliary lines L5 and L8, respectively.

Embodiment 2

This embodiment is the second embodiment of the present invention, in which Na is used as $M^I$ and Mg is used as $M^{II}$. Similarly to Embodiment 1 above, FIG. 10 and FIG. 11 illustrate glass composition ranges which form no crystal but give rise to glasses showing lower Rayleigh scattering intensities than pure silica glass ($SiO_2$) and satisfying z=5 or z=15.

Similarly to FIGS. 8 and 9, the vitrification area is the area above the line $\alpha$ and the area satisfying the condition R<1 is below the line $\beta$.

Figure 10:
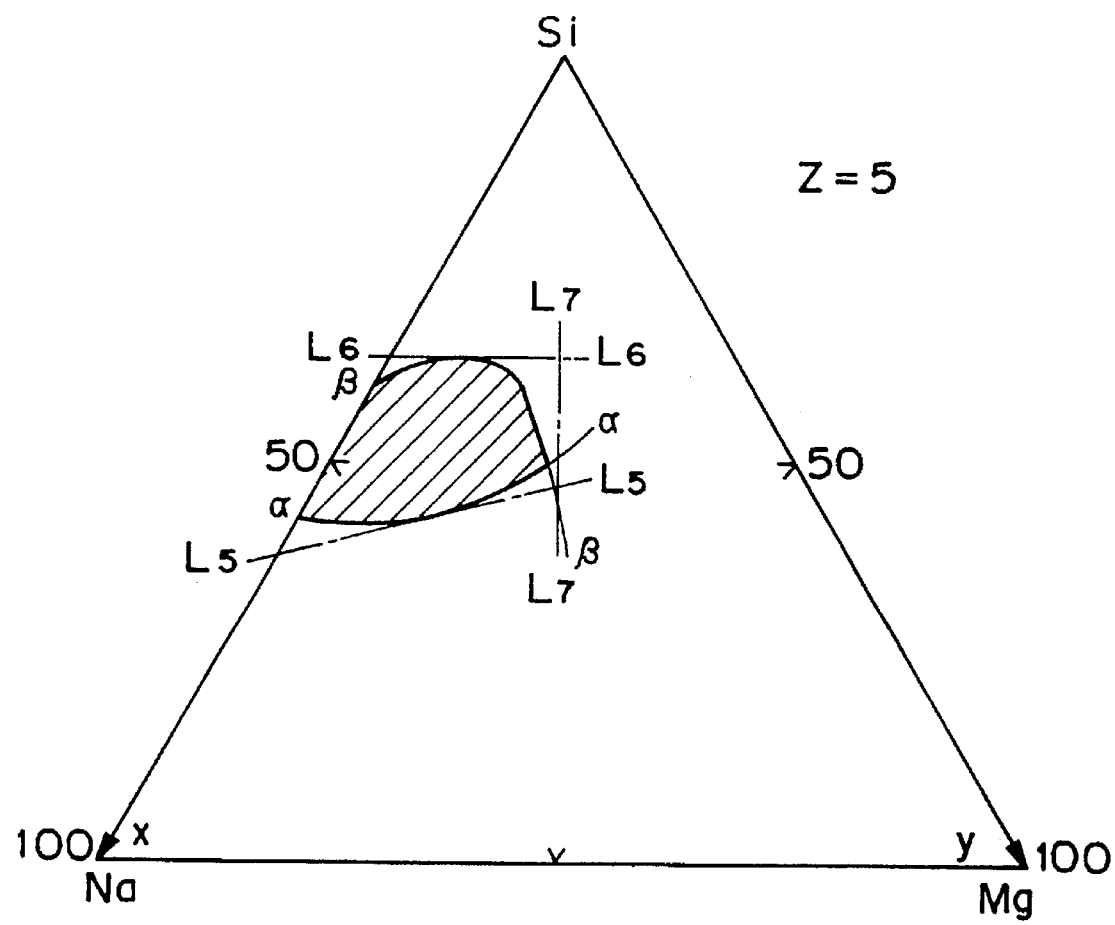
FIG. 10 is a ternary constitution diagram illustrating an overlap between a glass formation range and a composition range satisfying R<1 when $M^I$ is Na, $M^{II}$ is Mg, and z=5.
Figure 11:
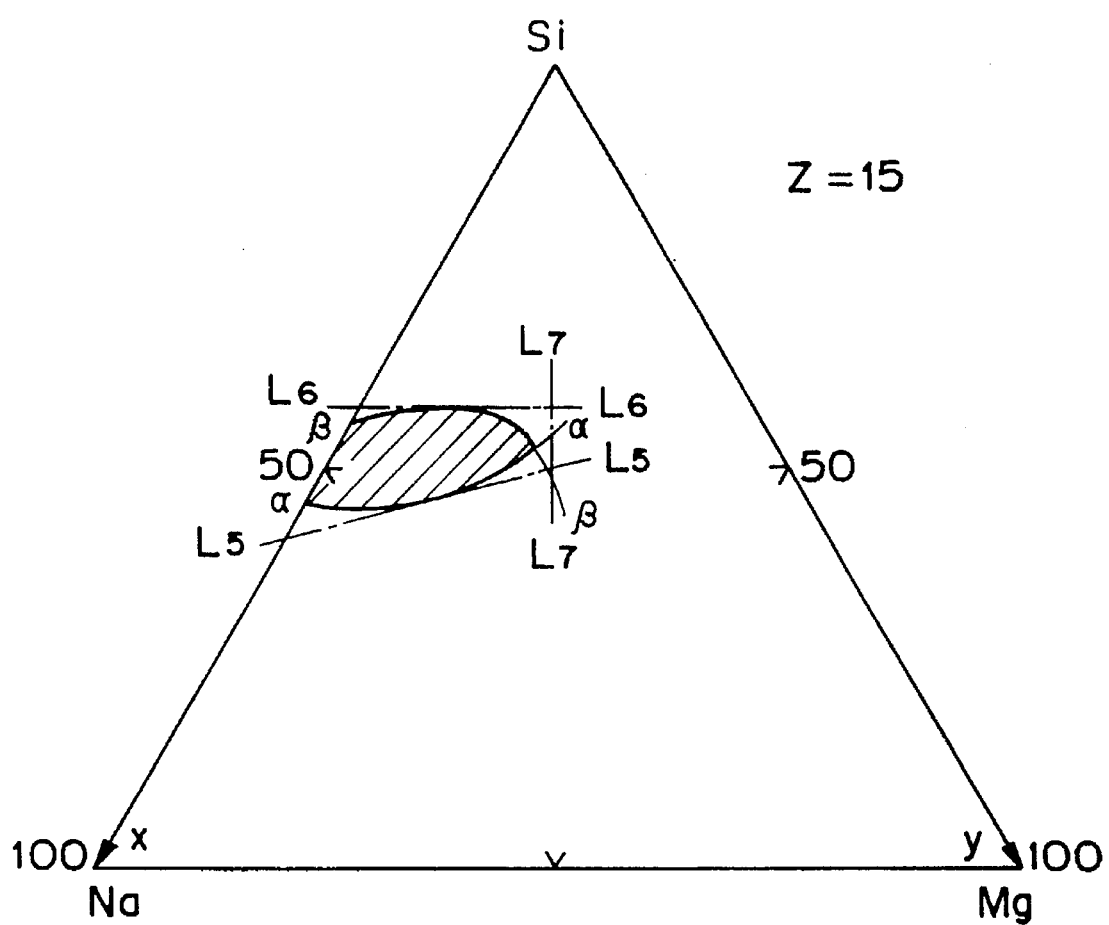
FIG. 11 is a ternary constitution diagram illustrating an overlap between a glass formation range and a composition range satisfying R<1 when $M^I$ is Na, $M^{II}$ is Mg, and z=15.

In FIGS. 10 and 11, auxiliary lines L5, L6, and L7 are defined in order to indicate the area embraced by the curves $\alpha$ and $\beta$ (hatched area) in terms of variables x, y, and z. The auxiliary line L5 is to approximate the curve $\alpha$ and is defined by the equation:

$$y = -3x/4 + 47.5 - 0.25z \quad (E4)$$

On the other hand, the auxiliary lines L6 and L7 are to approximate the curve $\alpha$ and are defined by the following equations:

$$y = x + 35 + z/2 \quad (E5)$$

$$y = x \quad (E6)$$

The auxiliary lines L5 through L8 are indicated in a dotted broken line in FIGS. 10 and 11.

In the case where x>20, no glass was obtained satisfying the condition of R<1. After all, the oxyfluoride glass of the present embodiment can be described as having a composition which satisfies the conditions $0<z<20$ and corresponds to the area embraced by the auxiliary lines L5, L6, and L7. Note that the conditions (5), (6), and (7) described above correspond to the auxiliary lines L5, L6, and L7, respectively.

Figure 12:
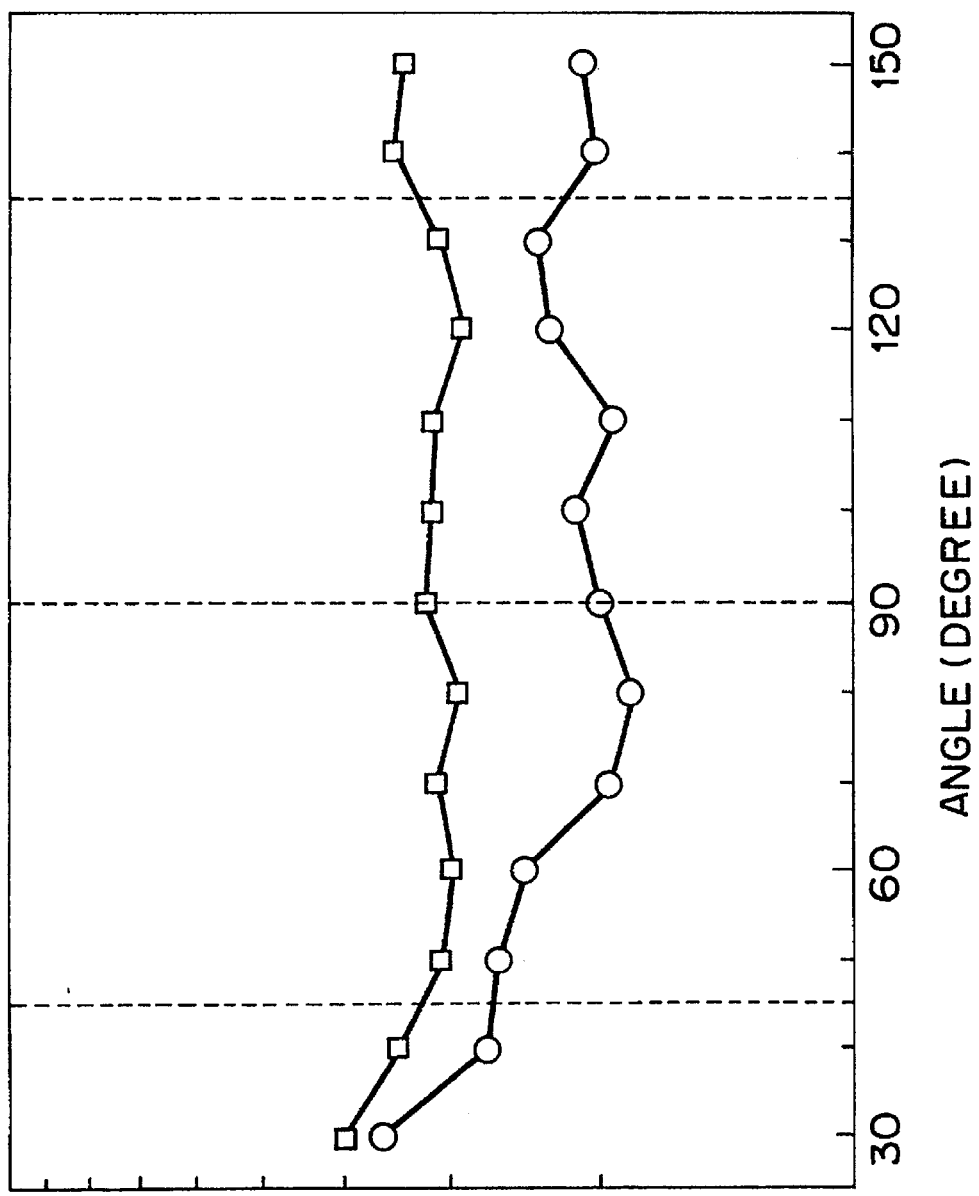
FIG. 12 is a graph illustrating angular dependence of Rayleigh scattering intensities of $65SiO_2$—$25Na_2O$—$5MgF_2$—$5MgO$ glass and pure $SiO_2$ glass, respectively.

FIG. 12 illustrates the results of measurements on Rayleigh scattering intensities of the glass specimen having a composition of $65SiO_2$—$25Na_2O$—$5MgF_2$—$5MgO$ (or 52Si—40Na—8Mg—94 O—6F) included in the above-described compositional range as indicated with circles (○) and similar results on pure $SiO_2$ glass specimen as indicated by blocks (□).

As will be apparent from FIG. 12, the glass specimen having the composition of the present embodiment shows a Rayleigh scattering intensity of about 70%, which is much lower than that of pure $SiO_2$ glass specimen. As far as the present inventors know, there has been known no report teaching that fluorine-containing silicate glass shows lower inherent scattering than pure $SiO_2$.

This leads an expectation that optical fibers made of the glass having the composition of the present embodiment show lower loss than that of optical fibers made of pure $SiO_2$.

As stated above, the glass specimens with the compositions within the range of the present embodiment show low Rayleigh scattering inherent to the material.

Embodiment 3

This embodiment is the third embodiment of the present invention, in which K is used as $M^I$ and Mg is used as $M^{II}$. Similarly to Embodiment 1 above, FIG. 13 and FIG. 14 illustrate glass composition ranges which form no crystal but give rise to glasses showing lower Rayleigh scattering intensities than pure silica glass ($SiO_2$) and satisfying z=5 or z=15.

Similarly to FIGS. 8 and 9, the vitrification area is the area above the line $\alpha$ and the area satisfying the condition R<1 is below the line $\beta$.

Figure 13:
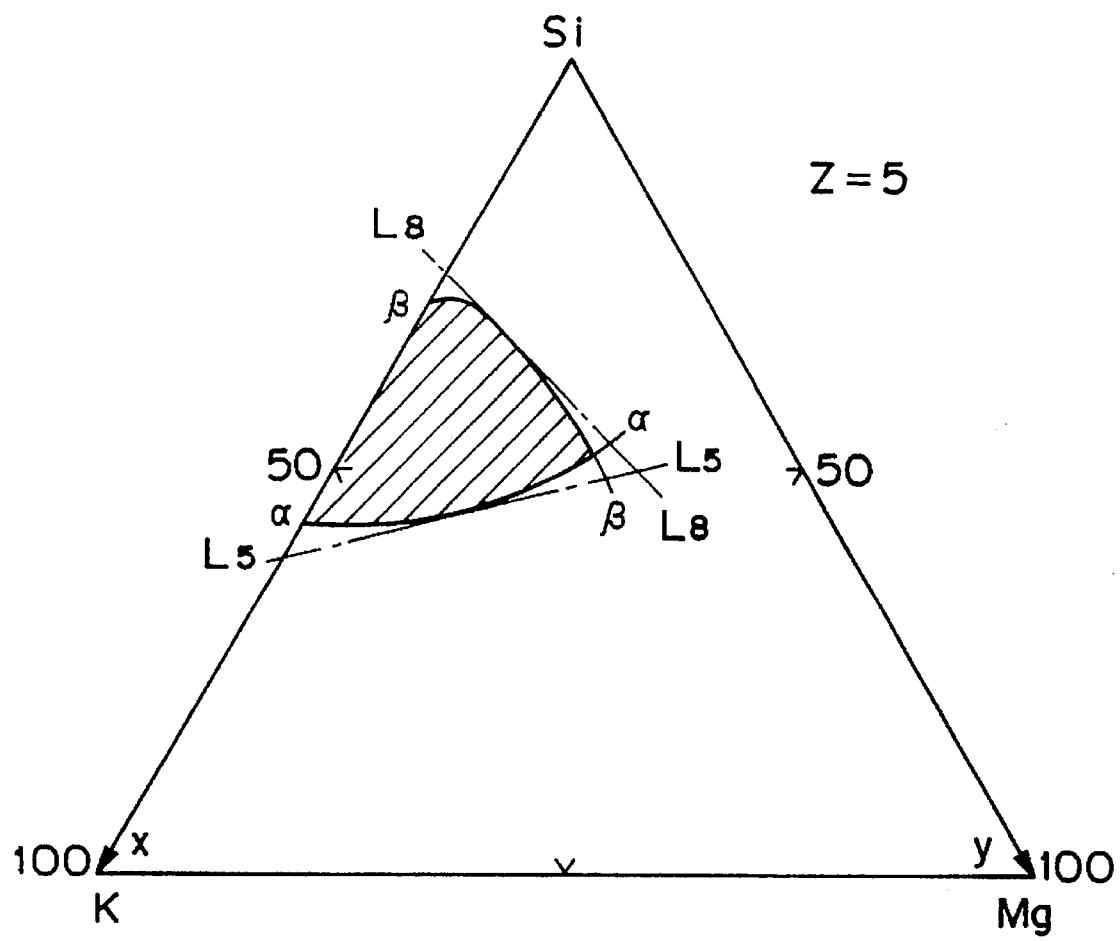
FIG. 13 is a ternary constitution diagram illustrating an overlap between a glass formation range and a composition range satisfying R<1 when $M^I$ is K, $M^{II}$ is Mg, and z=5.
Figure 14:
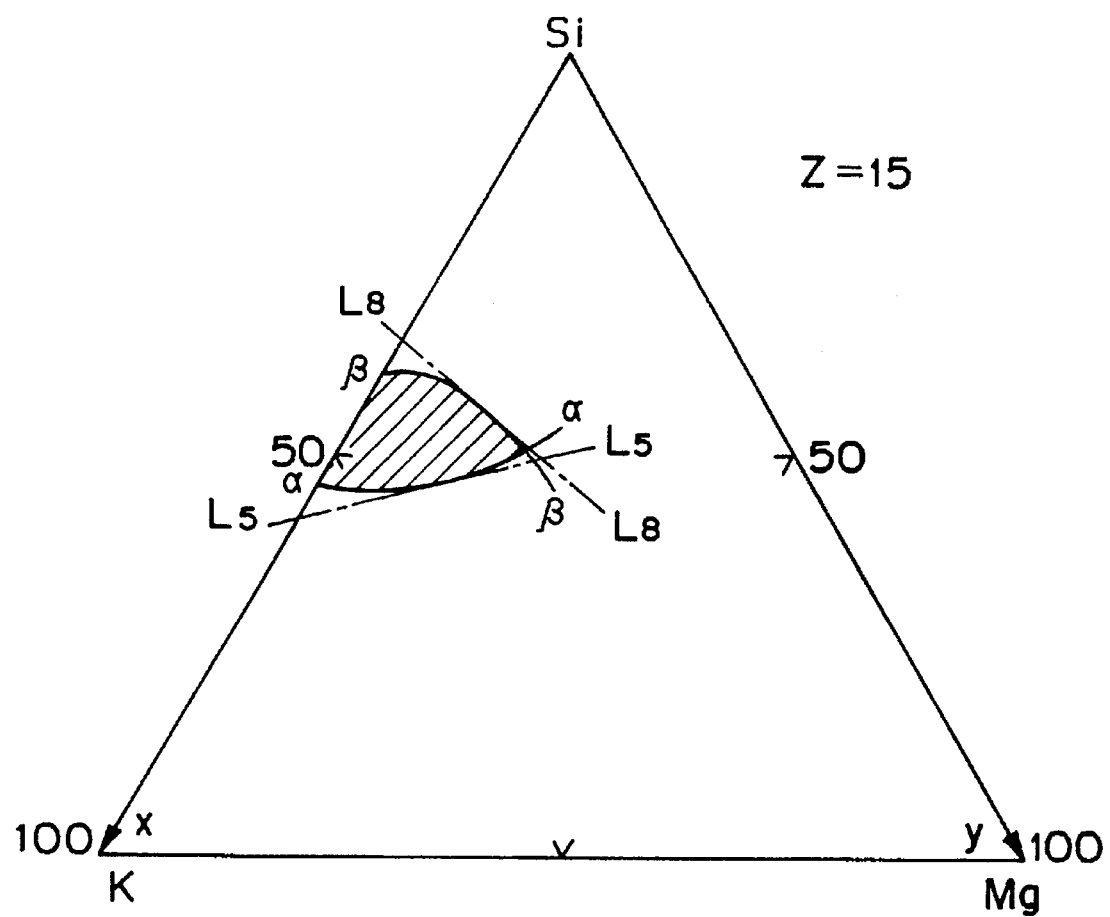
FIG. 14 is a ternary constitution diagram illustrating an overlap between a glass formation range and a composition range satisfying R<1 when $M^I$ is K, $M^{II}$ is Mg, and z=15.

In FIGS. 13 and 14, auxiliary lines L5 and L8 are defined in order to indicate the area embraced by the curves $\alpha$ and $\beta$ (hatched area) in terms of variables x, y, and z. The auxiliary line L5 is to approximate the curve $\alpha$ and is defined by the equation:

$$y = -3x/4 + 47.5 - 0.25z \quad (E4)$$

On the other hand, the auxiliary line L8 is to approximate the curve $\beta$ and defined by the following equations:

$$y = -100x/(21+z) + 100 \quad (E7)$$

The auxiliary lines L5 and L8 are indicated in a dotted broken line in FIGS. 13 and 14.

After all, the oxyfluoride glass of the present embodiment can be described as having a composition which satisfies the condition $0<z<20$ and corresponds to the area embraced by at least the auxiliary lines L5 and L8. Note that the conditions (5) and (8) described above correspond to the auxiliary lines L5 and L8, respectively.

Embodiment 4

Figure 15:
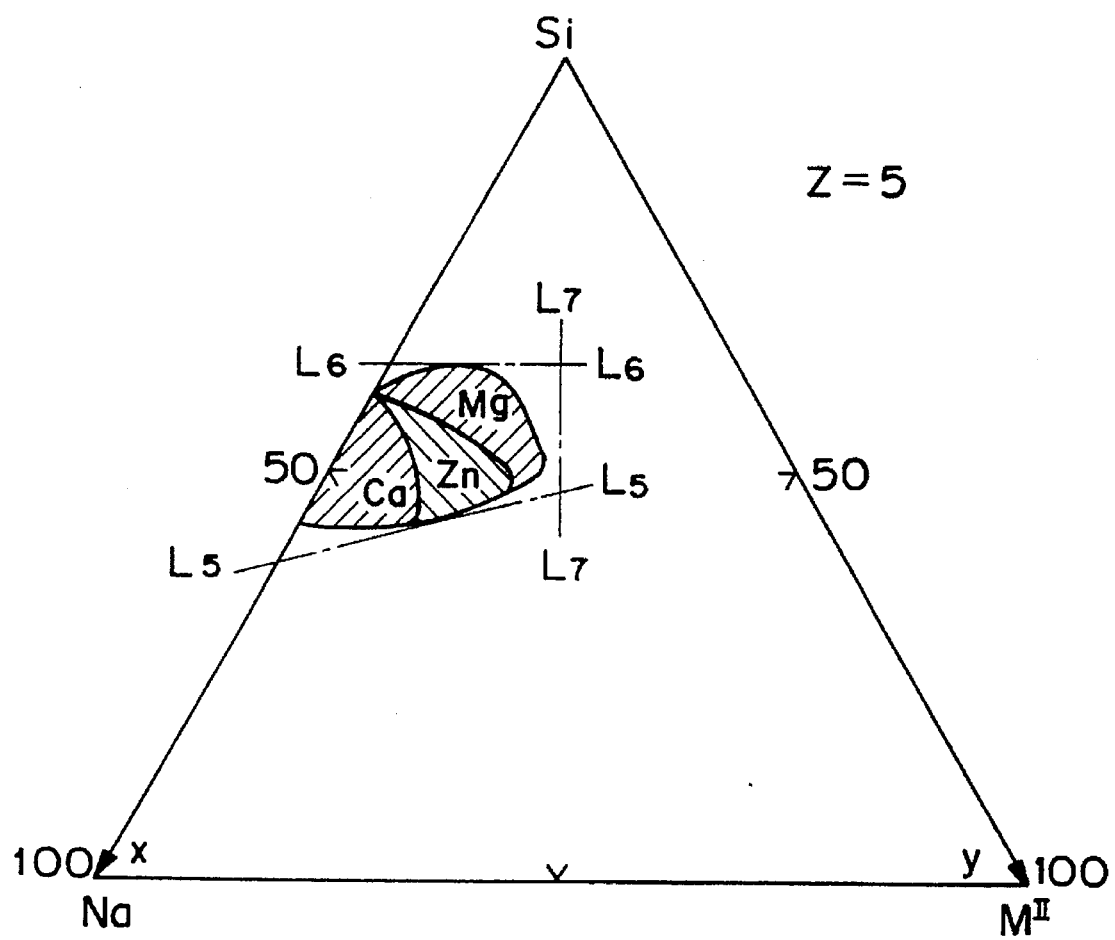
FIG. 15 is a ternary constitution diagram illustrating an overlap between a glass formation range and a composition range satisfying R<1 when $M^I$ is Na, $M^{II}$ is Mg, Zn, Ca, Sr, or Ba, and z=5.

This embodiment is the fourth embodiment of the present invention, in which Na is used as $M^I$ and Mg, Zn, Ca, Sr, or Ba is used as $M^{II}$. FIG. 15 illustrates a glass composition range in which glasses can be obtained that form no crystal but give rise to glasses showing a lower Rayleigh scattering intensity than pure silica glass ($SiO_2$) and satisfying z=5.

Curves obtained when Sr or Ba is used as $M^{II}$ are the same as the curve obtained when Ca is used as $M^{II}$. Changes in $M^{II}$ does not result in a substantial variation in the marginary curve of the vitrification area approximated the auxiliary line L5. On the other hand, the marginary curve approximated by the auxiliary lines L6 and L7 which satisfy the condition R<1 varies.

Embodiment 5

Figure 16:
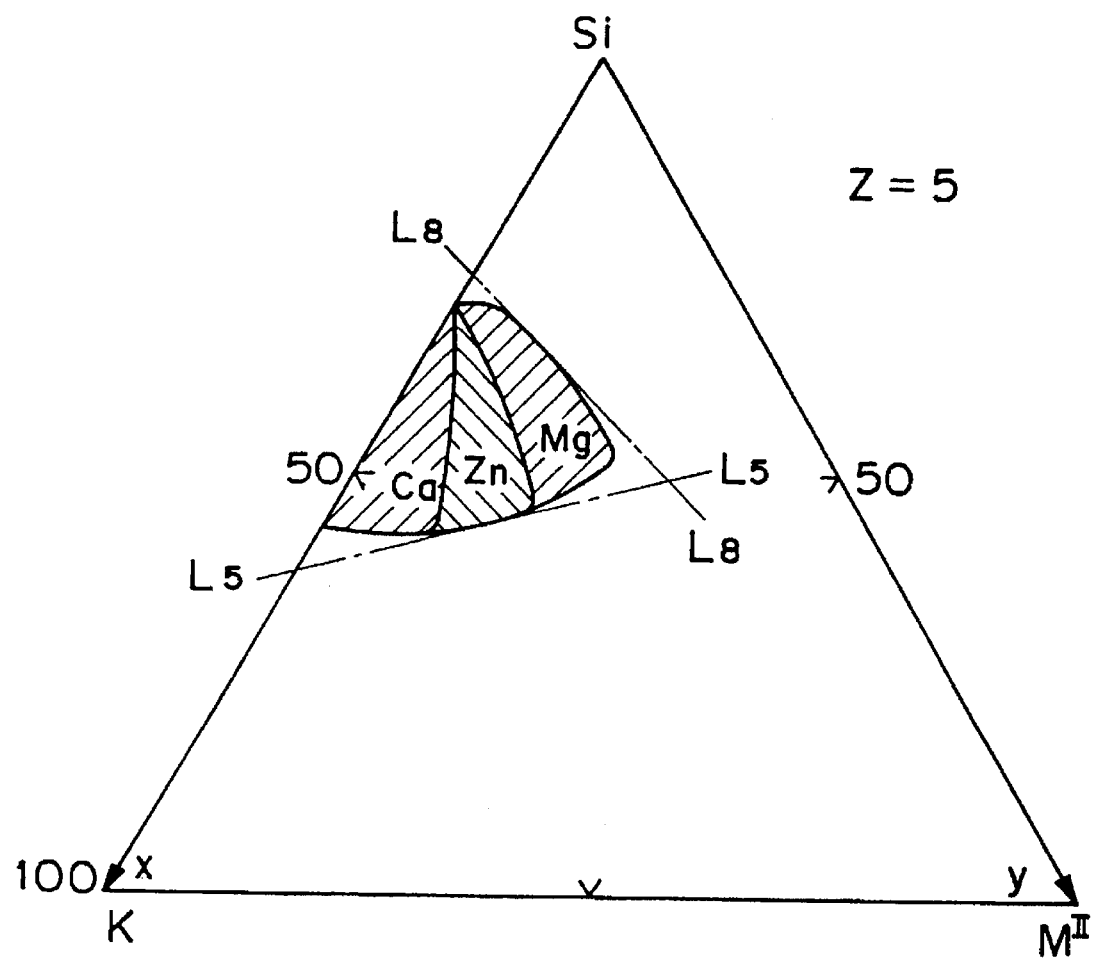
FIG. 16 is a ternary constitution diagram illustrating an overlap between a glass formation range and a composition range satisfying R<1 when $M^I$ is K, $M^{II}$ is Mg, Zn, Ca, Sr, or Ba, and z=5.

This embodiment is the fifth embodiment of the present invention, in which K is used as $M^I$ and Mg, Zn, Ca, Sr, or Ba is used as $M^{II}$. FIG. 16 illustrates a glass composition range in which glasses can be obtained that form no crystal but give rise to glasses showing a lower Rayleigh scattering intensity than pure silica glass ($SiO_2$) and satisfying z=5.

Curves obtained when Sr or Ba is used as $M^{II}$ are the same as the curve obtained when Ca is used as $M^{II}$. Changes in $M^{II}$ does not result in a substantial variation in the marginary curve of the vitrification area approximated the auxiliary line L5. On the other hand, the marginary curve approximated by the auxiliary line L8 which satisfies the condition R<1 varies.

In Embodiments 1 to 5 above, $M^I F$, i.e., a monovalent metal fluoride may also be used in order to introduce fluorine into the glass composition. Of course, a plurality of components may be used as $M^I$ and $M^{II}$.

Embodiment 6

This embodiment is the sixth embodiment of the present invention.

A porous glass matrix having a density of about 0.6 g/ml prepared by a VAD method was immersed in a 26% by weight aqueous sodium carbonate solution so that the solution could distribute inside the cavities of the matrix.

The matrix was taken out from the solution and immediately placed in a refrigerator at a temperature of −30° C. to freeze the solution with which the matrix was impregnated. Thereafter, the matrix was transferred into a sealed vessel which is connected to a vacuum pump and the pressure was reduced immediately to 0.55 Torr. After the reduced pressure was kept for 40 hours, the matrix was taken out and heated in an electric furnace at 850° C. for 30 minutes to obtain a transparent glass. The composition of the glass was analyzed by EPMA (Electron Probe Micro Analyzer). The results obtained are illustrated in FIG. 17.

Figure 17:
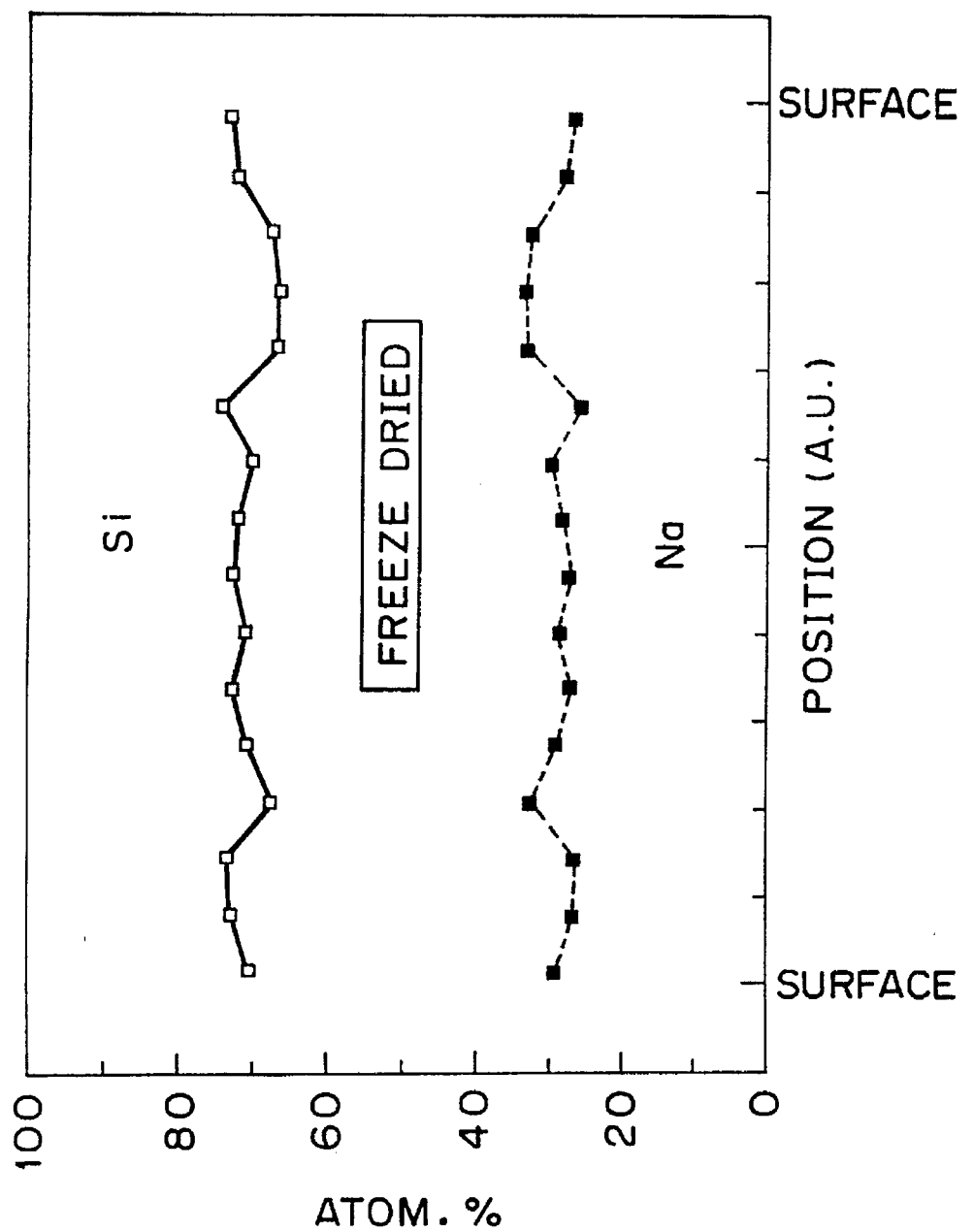
FIG. 17 is a graph illustrating potential dependence of a glass composition according to Embodiment 6 of the present invention on a position.

As illustrated in FIG. 17, after the freezing and drying (lyophilizing), sodium (Na) was doped in an atomic ratio of about 30 atom. % regardless of the position in the specimen.

Comparative Embodiment 1

The same procedure as in Embodiment 6 was repeated except that the matrix was spontaneously dried in a nitrogen stream for a week instead of freezing and drying. As a result, a glass body was obtained which was transparent only near the surface. The composition of the glass was analyzed by EPMA and the results obtained are illustrated in FIG. 18.

Figure 18:
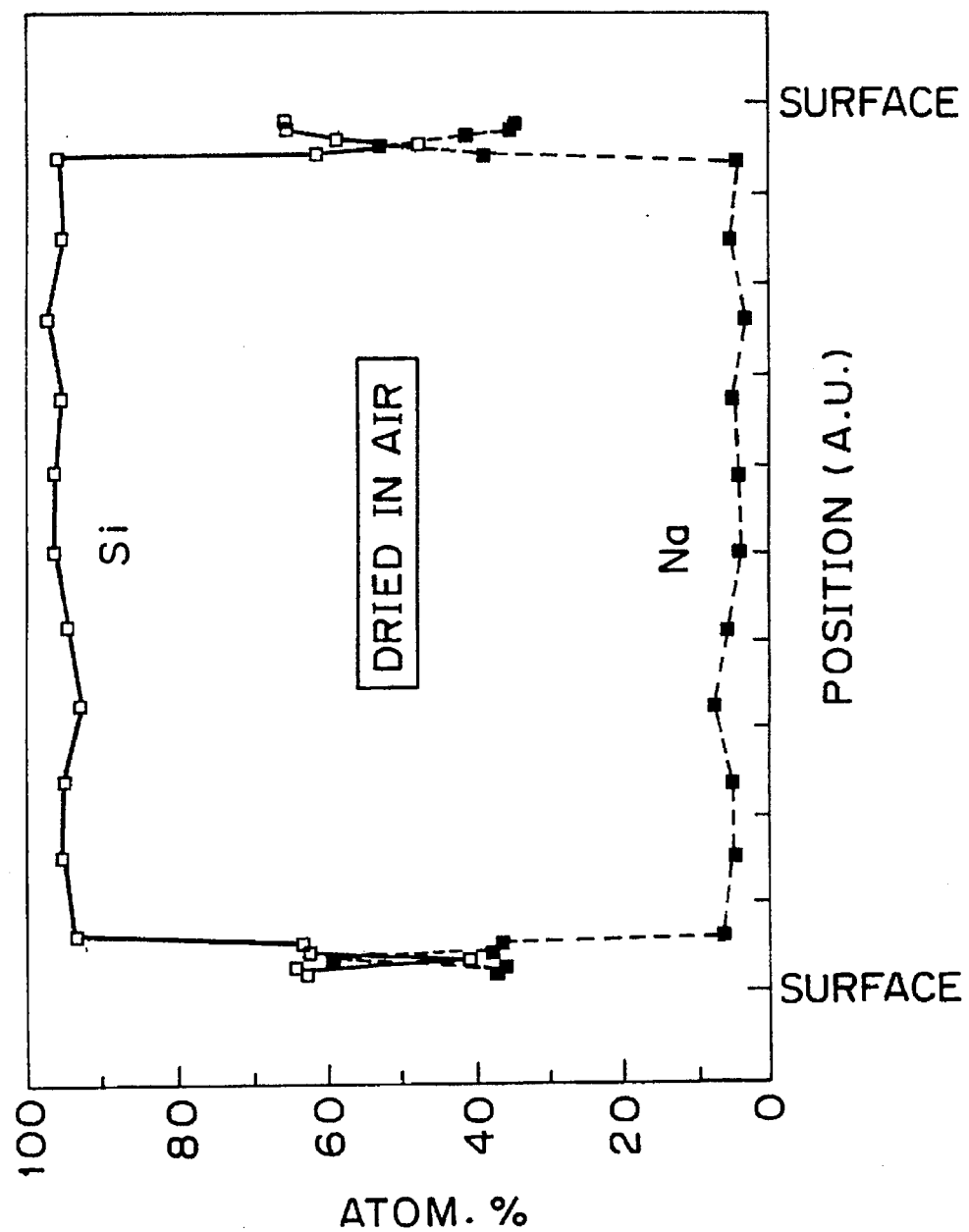
FIG. 18 is a graph illustrating positional dependence of a glass composition according to Comparative Embodiment 1.

As illustrated in FIG. 18, spontaneous drying results in localized doping of sodium in a concentration of 35 atom. % based on the total amount of cations near the surface of the matrix in contrast to only about 5atom. % based on the total amount of cations inside the matrix.

This indicates that according to Embodiment 6 in contrast to comparative embodiment 1, no localized deposition of the dopant occurs near the surface of the matrix, but the metal compound can be uniformly doped inside the porous glass matrix and the amount of the dopant doped inside the matrix increases by about 5-fold.

Embodiment 7

This embodiment is the seventh embodiment according to the present invention.

Figure 19:
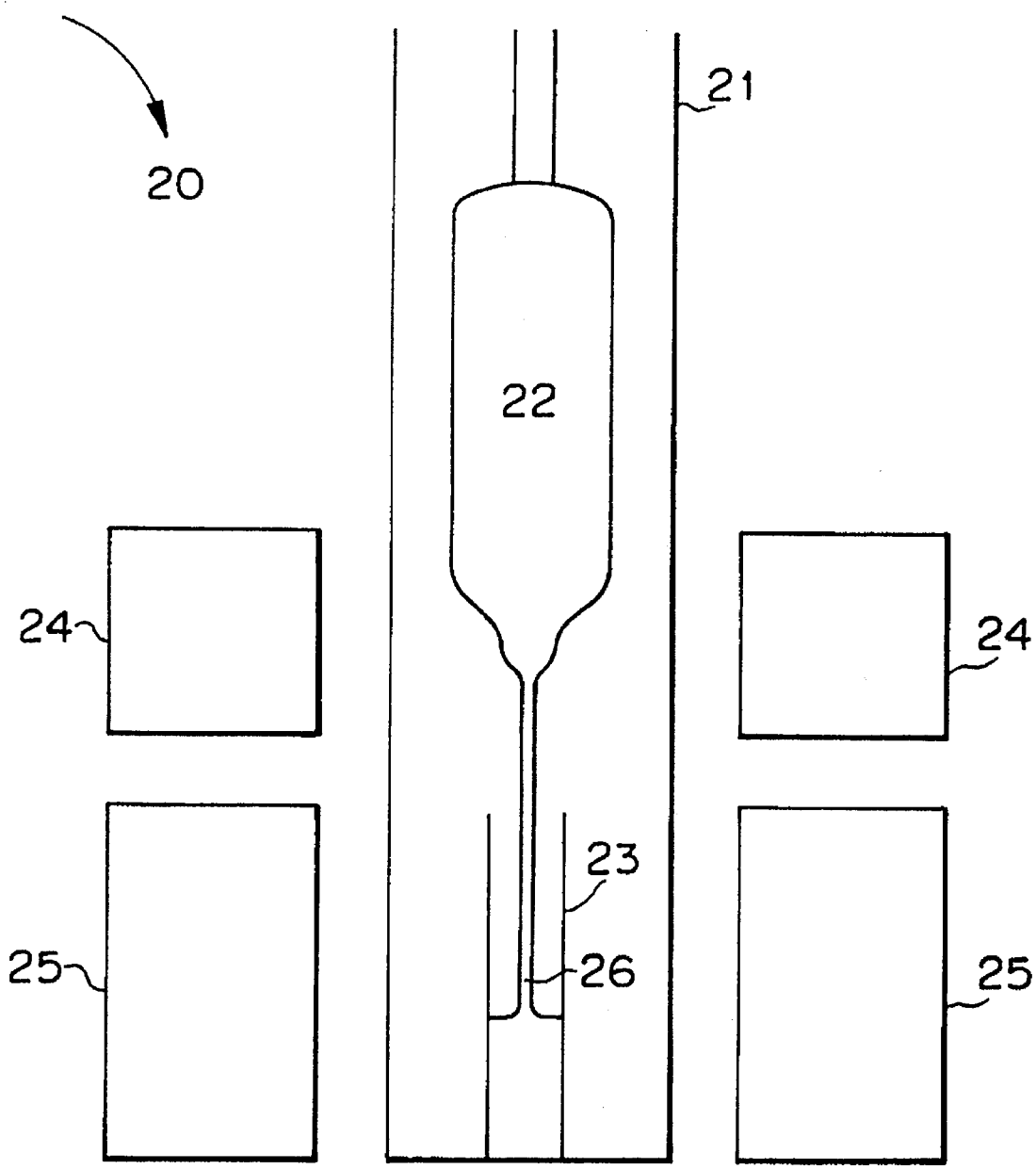
FIG. 19 is a schematic cross sectional view showing an electric furnace used when preparing a glass rod for fabricating an optical fiber according to the present invention by heating a porous glass matrix.

FIG. 19 is a schematic cross sectional view showing a vertical electric furnace used in the step of fabricating a glass rod by heating a porous glass body according to the present embodiment. In FIG. 19, 20 is a vertical electric furnace, 21 is a furnace body, 22 is a porous glass matrix, 23 is a silica glass vessel, 24 is an upper heater, and 25 is lower heater.

In order to prepare core and clad glasses, two porous glass matrixes having bulk densities of about 0.6 g/ml were provided which were prepared by a VAD method. The matrixes were immersed in respective metal compound solutions (Solutions A and B) having the compositions shown in Table 1, first run so that the solution could distribute inside the matrixes. Then, the matrixes were taken out from the respective solutions and immediately placed in a refrigerator at −30° C. to freeze the solutions with which the matrixes were impregnated. The matrixes were then transferred in a sealed vessel and the pressure was reduced to 0.2 Torr. Subsequently, the reduced pressure was kept until the lyophilization was completed. After completion of the lyophilization, the matrixes were immersed in respective solutions (Solution C) having the compositions shown in Table 1, second run. Then, the matrixes were lyophilized in the same manner as described above. This treatment was repeated twice.

The matrixes obtained were placed in the vertical electric furnace 20 shown in FIG. 19 and heated by the upper heater 24 at 900° C. in an atmosphere of He (helium) so that they could be vitrified. Glass melt 26 having low viscosity on the tip of the matrix 22 was heated at 800° C. by the lower heater 25 positioned on the bottom of the furnace 20 opposing the lower part of the furnace body 21 of the electric furnace 20. The glass melt was received by the vessel 23. When the vessel was full of the glass melt, it was cooled at a cooling rate of 1° C./minute. After the temperature of the melt reached room temperature, the vessel, which was made of quartz, was cut to remove the glass. Thus, two glass rods were obtained.

Table 1 shows refractive indices, relative refractive index differences, and relative Rayleigh scattering intensities relative to pure $SiO_2$. Solutions A, B, and C have the following compositions:

Solution A: 10 parts by weight of MgO fine particles having an average particle diameter of 500Å dispersed in 100 parts by weight of an aqueous 35 wt. % sodium formate;

Solution B: 10 parts by weight of MgO fine particles having an average particle diameter of 500Å dispersed in 100 parts by weight of a mixed aqueous solution of 30 wt. % sodium formate and 3 wt. % sodium fluoride; and Solution C: An aqueous 26 wt. % sodium carbonate solution.

TABLE 1

|  | Core Glass | Clad Glass |
| --- | --- | --- |
| First Run | Solution A | Solution B |
| Second and Subsequent Runs Composition | Solution C | Solution C |
| (Atom. %) |  |  |
| Na | 39 | 38 |
| Mg | 9 | 9 |
| Si | 52 | 53 |
| F | 0 | 3 |
| O | 100 | 100 |
| n | 1.510 | 1.507 |
| Δ | — | 0.2% |
| R | 0.5 | 0.7 |

Note) Δ: relative refractive index difference

Embodiment 8

This embodiment is the eighth embodiment of the present invention.

Glasses were prepared as follows. As starting materials were used $SiO_2$, $Na_2CO_3$, MgO, and $MgF_2$ powders having above 99.9% purities. These were weighed so that a desired glass composition could be obtained and mixed. The mixture was introduced into a platinum crucible, which was heated in an electric furnace at a temperature elevation rate of 10° C./minute to 1,300° to 1,500° C. and kept at that temperature for 1 hour for melting. After the melting, the melt was cooled at a cooling rate of −20° C./minute in the furnace. Below about 800° C., the cooling rate was lower than described above, and the glass was furnace cooled since the furnace had a large heat capacity. After the cooling was over, the crucible was taken out of the furnace and the content was visually observed to see if the contents were vitrified.

Rayleigh scattering measurement was made of a cylindrical glass having the same composition as described above and of a pure $SiO_2$ glass specimen prepared by VAD method. From the results obtained, relative values of Rayleigh scattering intensities at a scattering angle of 90° to that of pure $SiO_2$ glass were calculated.

Table 2, which illustrates the present embodiment in the case where $MgF_2$ and MgO are used as the above described $M^{II}X_x$ and $Na_2O$ was used as the above-described $M^{I}X'_y$, shows the glass compositions of core and clad, refractive index, relative refractive index difference ($\Delta$), and relative value R of Rayleigh scattering intensity to that of pure $SiO_2$ glass.

TABLE 2

| | $SiO_2$ (mol %) | $M^{II}X_x$ (mol %) | | $M^{I}X'_y$ (mol %) | nd | $\Delta$ (%) | R |
|---|---|---|---|---|---|---|---|
| Core glass | 60 | MgO (10) | | $Na_2O$ (30) | 1.514 | — | 0.4 |
| Clad Glass 1 | 60 | $MgF_2$, (5) | MgO (5) | $Na_2O$ (30) | 1.504 | 0.7 | 0.7 |
| Clad Glass 2 | 65 | $MgF_2$, (5) | MgO (5) | $Na_2O$ (25) | 1.500 | 1.0 | 0.7 |

As will be apparent from Table 2, the refractive index of the glass decreases with increased amount of $SiO_2$ or substitution of a part of MgO by $MgF_2$.

Figure 20:
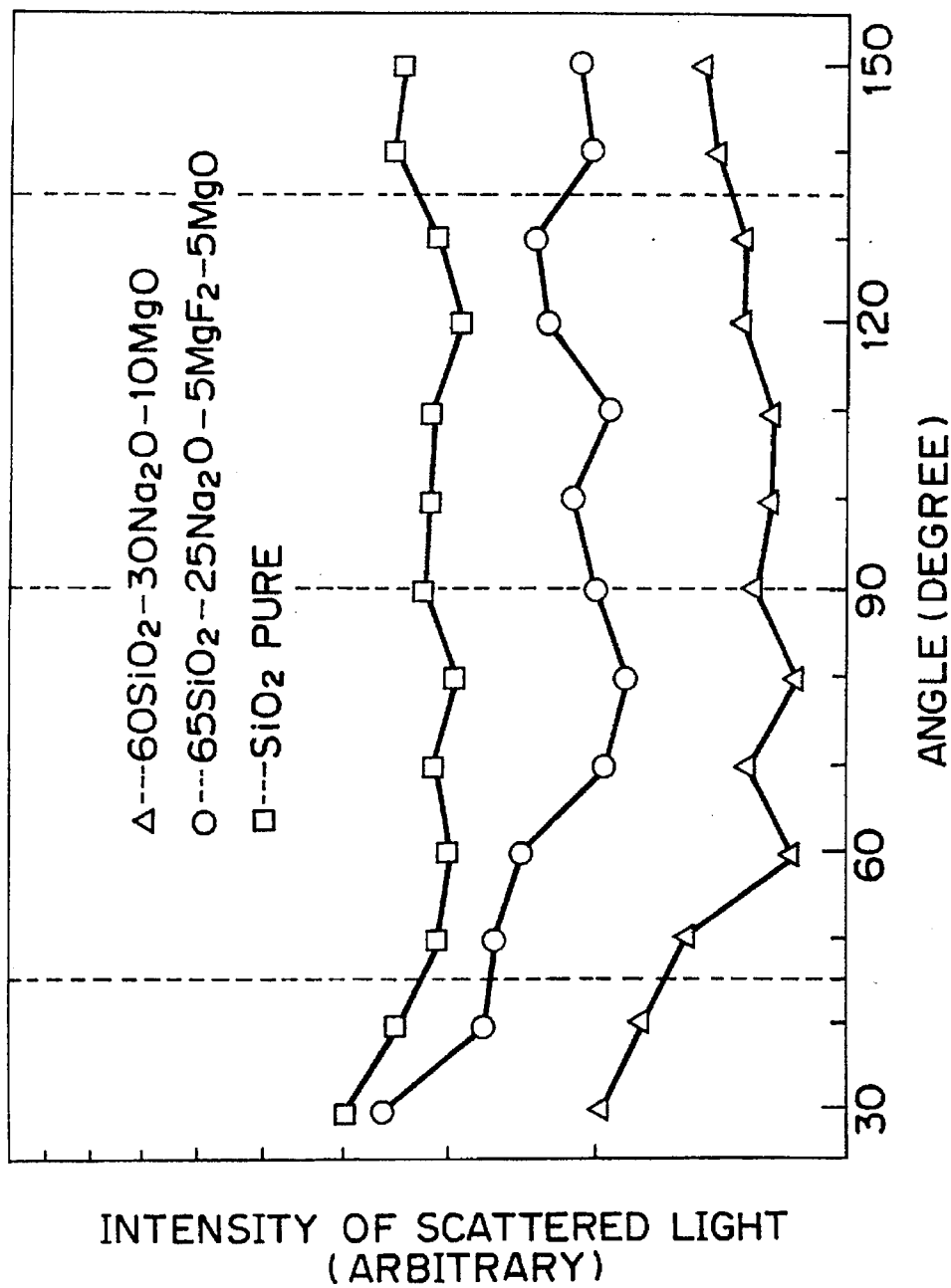
FIG. 20 is a graph illustrating angular dependence of Rayleigh scattering intensities of a core glass ($60SiO_2$—$30Na_2O$—$10MgO$), a clad glass ($65SiO_2$—$25Na_2O$—$5MgF_2$—$5MgO$), and pure $SiO_2$ glass.

FIG. 20 illustrates the results of measurements of Rayleigh scattering intensities over angle on the glass specimens shown in Table 2. FIG. 20 also illustrates similar results on pure $SiO_2$ glass specimen. Triangles ($\Delta$), circles (○) and blocks (□) represent core glass, clad glass, and pure $SiO_2$ glass, respectively. As will be apparent from FIG. 20, the glass specimens of the present embodiment show Rayleigh scattering intensities of about 70% and about 40%, respectively, which are much lower than that of the pure $SiO_2$ glass specimen. The refractive index of the clad glasses can be made by 1% lower than that of the core glass.

From the above-described results, it can also be seen that an optical fiber can be fabricated with a core made of the clad glass 1 and a clad made of the clad glass 2. The above-described results indicate that an optical fiber can be fabricated which has much lower loss than that of an optical fiber made of pure $SiO_2$ glass.

As described above, combination of the glasses having the compositions within the range of the present embodiment allows construction of a waveguide structure and fabrication of optical fibers having low light scattering.

Figure 21:
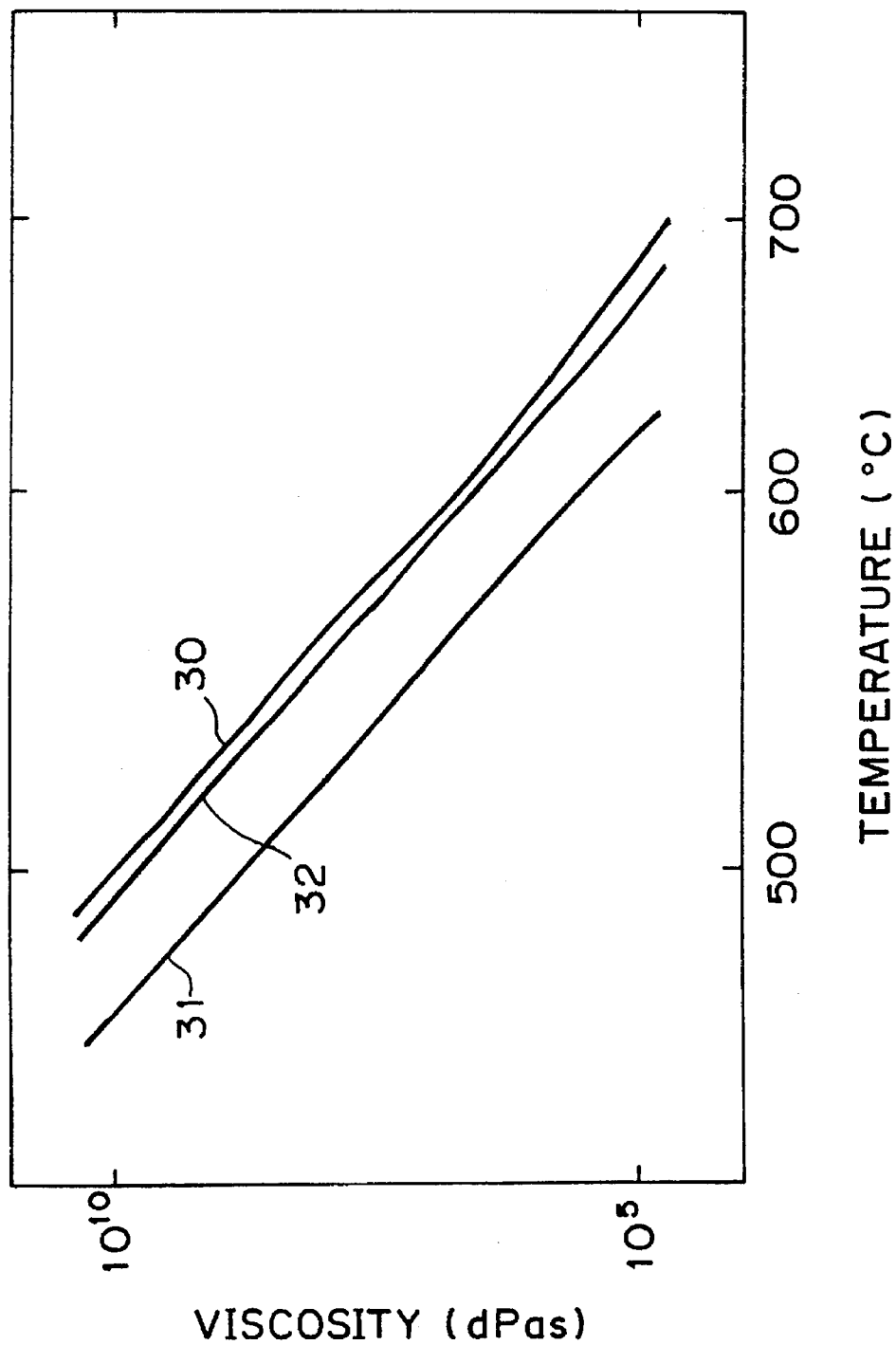
FIG. 21 is a graph plotting viscosity vs. temperature for the glasses in Table 3.

FIG. 21 is a graph plotting viscosities of the glass compositions shown in Table 2 above against temperature. In FIG. 21, reference numbers 30, 31, and 32 designate curves representing the core glass, clad glass 1, and clad glass 2, respectively. As will be apparent from FIG. 21 and Table 3, the clad glass 1 has the viscosity about 20 times smaller than that of the core glass. However, the clad glass 2 has substantially the same viscosity as the core glass.

TABLE 3

| Core Glass | Viscosity at 540° C. (dPas) | Ratio to Viscosity of Core Glass |
|---|---|---|
| Core Glass | $4.15 \times 10^8$ | — |
| Clad Glass 1 | $0.204 \times 10^8$ | 0.049 |
| Clad Glass 2 | $1.46 \times 10^8$ | 0.35 |

Embodiment 9

This embodiment is a ninth embodiment of the present invention, in which metal compounds other than $MgF_2$ are used as $M^{II}X_x$ or metal compounds other than $Na_2O$ are used as $M^{I}X'_y$. Table 4 shows the glass compositions of the present embodiment.

TABLE 4

| | $SiO_2$ (mol %) | $M^{II}X_x$ (mol %) | | $M^{I}X'_y$ (mol %) | $n_d$ | $\Delta$ (%) | R |
|---|---|---|---|---|---|---|---|
| Core glass | 60 | CaO (10) | | $Na_2O$ (30) | 1.530 | — | 0.9 |
| Clad Glass | 65 | $CaF_2$, (5) | CaO (5) | $Na_2O$ (25) | 1.514 | 1.0 | 0.9 |
| Core glass | 60 | MgO (10) | | $K_2O$ (30) | 1.513 | — | 0.5 |
| Clad Glass | 65 | $MgF_2$, (5) | MgO (5) | $K_2O$ (25) | 1.495 | 1.2 | 0.8 |

In the above embodiments, a plurality of components may be used as $M^{II}X_x$ and $M^{I}X'_y$. Further, a monovalent metal fluoride may also be used in order to introduce fluorine into the glass composition.

Embodiment 10

This embodiment is a tenth embodiment, in which an optical fiber is fabricated with the core glass and the clad glass prepared in Embodiment 7 above.

The fiber is prepared by a rod-in-tube method by processing the clad glass into a pipe and inserting the core glass in the hole of the pipe. The fiber has a loss of 1 dB/m at 800 nm.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber comprising:

a core made of a silicate glass comprising silicon, a divalent metal compound, and a monovalent metal compound, and a clad made of an oxyfluoride glass composition comprising silicon dioxide, a divalent metal, a monovalent metal, oxygen, and fluorine;

wherein said oxyfluoride glass composition satisfies the following requirements (1) to (4):

(1) said silicon is present in an amount of 40% or more and 75% or less based on total numbers of cations;

(2) said divalent metal is present in an amount of 30% or less based on total number of cations;

(3) said monovalent metal is present in an amount of 18% or more and 60% or less based on total number of cations; and (4) said fluorine is present in an amount of below 20% based on total amount of anions; and wherein said oxyfluoride glass composition satisfies one of the following requirements:

said clad glass contains more $SiO_2$ than said core; and said clad glass contains fluoride(s) of said divalent metal and/or said monovalent metal, so that said clad has a refractive index smaller than that of said core.

2. The optical fiber as claimed in claim 1, wherein said divalent metal is at least one element selected from the group consisting of Mg, Ca, Sr, Ba, and Zn, and said monovalent metal is at least one element selected from the group consisting of Li, Na, and K.

3. The optical fiber as claimed in claim 1, wherein said core glass and said clad glass have viscosities so that at least one point within the ranges between $10^5$ dPas and $10^{10}$ dPas, a ratio of said viscosity of said core glass to that of said clad glass is from 0.33 to 3.

* * * * *